United States Patent
Yang et al.

(10) Patent No.: US 10,368,341 B2
(45) Date of Patent: *Jul. 30, 2019

(54) METHOD AND DEVICE FOR UPLINK RESOURCE ALLOCATION

(71) Applicant: LG ELECTRONICS INC., Seoul (KR)

(72) Inventors: Suckchel Yang, Anyang-si (KR); Mingyu Kim, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

This patent is subject to a terminal disclaimer.

(21) Appl. No.: 15/603,937

(22) Filed: May 24, 2017

(65) Prior Publication Data
US 2017/0347354 A1 Nov. 30, 2017

Related U.S. Application Data

(63) Continuation of application No. 14/853,722, filed on Sep. 14, 2015, now Pat. No. 9,706,535, which is a
(Continued)

(51) Int. Cl.
*H04L 5/00* (2006.01)
*H04L 27/26* (2006.01)
(Continued)

(52) U.S. Cl.
CPC ....... *H04W 72/0413* (2013.01); *H04L 5/0023* (2013.01); *H04L 5/0037* (2013.01);
(Continued)

(58) Field of Classification Search
None
See application file for complete search history.

(56) References Cited

U.S. PATENT DOCUMENTS 7,584,397 B2   9/2009   Terry
7,885,221 B2   2/2011   Seo et al.
(Continued)

FOREIGN PATENT DOCUMENTS

CN   101472300 A   7/2009
CN   101657018 A   2/2010
(Continued)

OTHER PUBLICATIONS

3GPP, "3rd Generation Partnership Project; Technical Specification Group Radio Access Network; Evolved Universal Terrestrial Radio Access (E-UTRA); Physical layer procedures (Release 9)," 3GPP TS 36.213 V9.3.0, Sep. 2010, pp. 1-80.
(Continued)

*Primary Examiner* — Gregory B Sefcheck
(74) *Attorney, Agent, or Firm* — Birch, Stewart, Kolasch & Birch, LLP

(57) ABSTRACT

A method for transmitting an uplink signal by a device in a wireless communication system, the method includes receiving a downlink control channel (DCI) format defined for uplink (UL) multi-antenna transmission mode, the DCI format including a resource allocation (RA) field; and transmitting an uplink signal using the RA field, wherein a size of the RA field is represented by the following expression: MAX (RASizeA, RASizeB), wherein RASizeA is a first number of bits required for representing a resource indication value (RIV) corresponding to a starting resource block (RB) and a length of contiguously allocated RBs within a given uplink bandwidth, and wherein RASizeB is a second number of bits required for representing a combinatorial index r corresponding to 4 indexes, and the 4 indexes are used to indicate a start resource block group (RBG) index and an end RBG index of a first RB set and a start RBG
(Continued)

Example of RA field size $$\text{Max}\left(\left\lceil \log_2\left(\left\lceil \frac{N_{RB}^{UL}/P+1}{4} \right\rceil\right) \right\rceil, \left\lceil \log_2(N_{RB}^{UL}(N_{RB}^{UL}+1)/2) \right\rceil \right)$$

index and an end RBG index of a second RB set within the given uplink bandwidth.

17 Claims, 21 Drawing Sheets

Related U.S. Application Data continuation of application No. 14/221,120, filed on Mar. 20, 2014, now Pat. No. 9,197,384, which is a continuation of application No. 13/805,312, filed as application No. PCT/KR2011/006770 on Sep. 14, 2011, now Pat. No. 8,737,344.

(60) Provisional application No. 61/422,655, filed on Dec. 13, 2010, provisional application No. 61/419,234, filed on Dec. 2, 2010, provisional application No. 61/414,398, filed on Nov. 16, 2010, provisional application No. 61/382,890, filed on Sep. 14, 2010.

(51) Int. Cl.
*H04W 72/04* (2009.01)
*H04W 88/02* (2009.01)

(52) U.S. Cl.
CPC .......... *H04L 5/0044* (2013.01); *H04L 5/0094* (2013.01); *H04L 27/2636* (2013.01); *H04W 72/042* (2013.01); *H04W 88/02* (2013.01)

(56) References Cited

U.S. PATENT DOCUMENTS

| | | | |
|---|---|---|---|
| 8,009,606 B2 | 8/2011 | Seo et al. | |
| 8,320,319 B2 | 11/2012 | Löhr et al. | |
| 8,675,578 B2 | 3/2014 | Kim et al. | |
| 8,855,072 B2 | 10/2014 | Moon et al. | |
| 8,897,283 B2 | 11/2014 | Seo et al. | |
| 8,971,279 B2 | 3/2015 | Seo et al. | |
| 9,055,576 B2 | 6/2015 | Chen et al. | |
| 9,949,261 B2 * | 4/2018 | Chen ................. | H04W 72/0453 |
| 2005/0232156 A1 | 10/2005 | Kim et al. | |
| 2009/0325585 A1 | 12/2009 | Farajidana et al. | |
| 2010/0098008 A1 | 4/2010 | Ishii et al. | |
| 2010/0111107 A1 | 5/2010 | Han et al. | |
| 2010/0157913 A1 | 6/2010 | Nagata et al. | |
| 2010/0195748 A1 | 8/2010 | Nam et al. | |
| 2010/0246512 A1 | 9/2010 | Kawamura et al. | |
| 2011/0019636 A1 | 1/2011 | Fukuoka et al. | |
| 2011/0069637 A1 | 3/2011 | Liu et al. | |
| 2011/0085508 A1 | 4/2011 | Wengerter et al. | |
| 2011/0134874 A1 | 6/2011 | Nakao et al. | |
| 2011/0205995 A1 | 8/2011 | Grovlen | |
| 2011/0222489 A1 | 9/2011 | Awad | |
| 2013/0089063 A1 | 4/2013 | Yang et al. | |

FOREIGN PATENT DOCUMENTS

| | | |
|---|---|---|
| CN | 101801093 A | 8/2010 |
| JP | 2013-538485 A | 10/2013 |
| KR | 10-2005-0081528 A | 8/2005 |
| RU | 2008100225 A | 7/2009 |
| WO | WO 2008/023594 A1 | 2/2008 |
| WO | WO 2008/108223 A1 | 9/2008 |
| WO | WO 2009/044686 A1 | 4/2009 |
| WO | WO 2010/016274 A1 | 2/2010 |
| WO | WO 2010/016737 A2 | 2/2010 |

OTHER PUBLICATIONS

3GPP; "3rd Generation Partnership Project; Technical Specification Group Radio Access Network; Evolved Universal Terrestrial Radio Access (E-UTRA); Further advancements for E-UTRA physical layer aspects (Release 9)"; 3GPP TR 36.814 V9.0.0; Mar. 2010; 104 pages.

3GPP; "3rd Generation Partnership Project; Technical Specification Group Radio Access Network; Evolved Universal Terrestrial Radio Access (E-UTRA); Multiplexing and channel coding (Release 9)"; 3GPP TS 36.212 V9.2.0; Jun. 2010; 61 pages.

3GPP; "3rd Generation Partnership Project; Technical Specification Group Radio Access Network; Evolved Universal Terrestrial Radio Access (E-UTRA); Physical layer procedures (Release 9)"; 3GPP TS 36.213 V9.2.0; Jun. 2010; 80 pages.

Huawei, "UL Non-contiguous Transmission for CA," 3GPP TSG RAN WG1 meeting #61bis, R1-103889, Dresden, Germany, Jun. 28-Jul. 2, 2010, 7 pages.

ZTE, "Uplink Non-contiguous Resource Allocation for LTE-Advanced," 3GPP TSG RAN WG1 Meeting #58bis, Oct. 12-16, 2009, 6 pages, R1-093803.

ZTE, "Uplink Non-Contiguous Resource Allocation for LTE-Advanced," 3GPP TSG RAN WG1, Meeting #60, Agenda Item 7.1.6, R1-100965, San Francisco, California, USA, Feb. 22-26, 2010, 7 pages.

NTT Docomo, "Further Discussion on Signaling to Support Non-contiguous RB Allocation," 3GPP TSG RAN WG1 Meeting #62, R1-104924, Madrid, Spain, Aug. 23-27, 2010, pp. 1/7-7/7.

U.S. Appl. No. 61/087,171, filed Aug. 8, 2008, Seo et al., "Resource Allocation Signaling Method for Multiple Frequency Blocks".

U.S. Appl. No. 61/249,911, filed Oct. 8, 2009, Chen et al., "LTE—A Uplink Resource Allocation".

U.S. Appl. No. 61/255,440, filed Oct. 27, 2009, Chen et al., "LTE—A Uplink Resource Allocation".

3GPP, "3rd Generation Partnership Project; Technical Specification Group TSG RAN Universal Terrestrial Radio Access (UTRA) and Evolved Universal Terrestrial Radio Access (E-UTRA); Radio measurement collection . . .," 3GPP TS 37.320, V0.7.1, Aug. 2010, pp. 1-17.

Alcatel-Lucent Shanghai Bell et al., "Signalling for Non-Contiguous PUSCH Resource Allocation," 3GPP TSG RAN WG1 Meeting #62, R1-104389, Madrid, Spain, Aug. 23-27, 2010, 6 pages.

Panasonic, "Email discussion summary on PUSCH resource allocation," 3GPP TSG RAN WG1 Meeting #61, R1-103200, Montreal, Canada, May 10-14, 2010, pp. 1-13.

* cited by examiner

Localized DFT-s-OFDMA

Clustered DFT-s-OFDMA

FIG. 15

| RGB index (Total number of RA RBGs = 9) (10 is virtual RBG) | $s_0$ comb (10-$s_0$, 4-0) | $s_1$ comb (10-$s_1$, 4-1) | $s_2$ comb (10-$s_2$, 4-2) | $s_3$ comb (10-$s_3$, 4-3) |
|---|---|---|---|---|
| 1 | 126 | 84 | 36 | 9 |
| 2 | ⓻⓪ | 56 | 28 | 8 |
| 3 | 35 | ㉟ | 21 | 7 |
| 4 | 15 | 20 | 15 | 6 |
| 5 | 5 | 10 | ⑩ | 5 |
| 6 | 1 | 4 | 6 | 4 |
| 7 | 0 | 1 | 3 | 3 |
| 8 | 0 | 0 | 1 | ② |
| 9 | 0 | 0 | 0 | 1 |
| 10 | 0 | 0 | 0 | 0 |

▨ Unavailable region

Ex) In case of $s_0$=2, $s_1$=3, $s_2$=5, $s_3$=8 (r = 70+35+10+2 = 117)
In this case, RBG #2 (one RBG) for first cluster is allocated.
RBGs #5~#7 (three RBGs) for second cluster are allocated.

Example of RA field size $$\text{Max}\left(\left\lceil \log_2\left(\left\lceil \frac{\lceil N_{RB}^{UL}/P+1 \rceil}{4} \right\rceil\right)\right\rceil, \left\lceil \log_2(N_{RB}^{UL}(N_{RB}^{UL}+1)/2)\right\rceil\right)$$

METHOD AND DEVICE FOR UPLINK RESOURCE ALLOCATION

CROSS-REFERENCE TO RELATED APPLICATIONS

This Application is a Continuation of U.S. patent application Ser. No. 14/853,722 filed on Sep. 14, 2015 (now U.S. Pat. No. 9,706,535 issued on Jul. 11, 2017), which is a Continuation of U.S. patent application Ser. No. 14/221,120 filed on Mar. 20, 2014 (now U.S. Pat. No. 9,197,384 issued on Nov. 24, 2015), which is a Continuation of U.S. patent application Ser. No. 13/805,312 filed on Dec. 18, 2012 (now U.S. Pat. No. 8,737,344 issued on May 27, 2014), which is the National Phase of PCT International Application No. PCT/KR2011/006770 filed on Sep. 14, 2011, which claims the benefit under 35 U.S.C. § 119(e) to U.S. Provisional Application Nos. 61/422,655 filed on Dec. 13, 2010, 61/419,234 filed on Dec. 2, 2010, 61/414,398 filed on Nov. 16, 2010 and 61/382,890 filed on Sep. 14, 2010, all of which are hereby expressly incorporated by reference into the present application.

BACKGROUND OF THE INVENTION

Field of the Invention

The present invention relates to a wireless communication system, and more particularly to a method and apparatus for performing contiguous or non-contiguous uplink resource allocation.

Discussion of the Related Art

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

SUMMARY OF THE INVENTION

Accordingly, the present invention is directed to a method and apparatus for performing uplink resource allocation in a wireless communication system that substantially obviate one or more problems due to limitations and disadvantages of the related art. An object of the present invention is to provide a method and apparatus for efficiently allocating resources in a wireless communication system. Another object of the present invention is to provide a method and apparatus for contiguously or non-contiguously allocating resources to transmit an uplink (UL) signal.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

The object of the present invention can be achieved by providing a method for transmitting an uplink signal in a wireless communication system, the method including: receiving a control channel signal including a resource allocation (RA) field; and transmitting an uplink signal according to the control channel signal, wherein a size of the resource allocation field is represented by the following equation:

$$\text{Max}\left(\left\lceil \log_2\left(\binom{\lceil N_{RB}^{UL}/P+1\rceil}{4}\right)\right\rceil, \lceil \log_2(N_{RB}^{UL}(N_{RB}^{UL}+1)/2)\rceil\right) \quad \text{[Equation]}$$

where, $N_{RB}^{UL}$ is the number of uplink (UL) resource blocks (RBs), P is a size of uplink (UL) Resource Block Group (RBGs), $\lceil \ \rceil$ is a ceiling function, Max(x, y) is a higher one of x and y, and $$\binom{x}{y} \text{ is } \frac{x(x-1)\ldots(x-y+1)}{y(y-1)\ldots 1}.$$

In another aspect of the present invention, a communication device for use in a wireless communication system includes: a radio frequency (RF) unit; and a processor, wherein the processor is configured to receive a control channel signal including a resource allocation (RA) field, and to transmit an uplink signal according to the control channel signal, wherein a size of the resource allocation field is represented by the following equation:

$$\text{Max}\left(\left\lceil \log_2\left(\binom{\lceil N_{RB}^{UL}/P+1\rceil}{4}\right)\right\rceil, \lceil \log_2(N_{RB}^{UL}(N_{RB}^{UL}+1)/2)\rceil\right) \quad \text{[Equation]}$$

where, $N_{RB}^{UL}$ is the number of uplink (UL) resource blocks (RBs), P is a size of uplink (UL) Resource Block Group (RBGs), $\lceil \ \rceil$ is a ceiling function, Max(x, y) is a higher one of x and y, and $$\binom{x}{y} \text{ is } \frac{x(x-1)\ldots(x-y+1)}{y(y-1)\ldots 1}.$$

P may be given by the following table:

TABLE

| $N_{RB}^{UL}$ | Size of UL RBG (P) |
|---|---|
| ≤10 | 1 |
| 11-26 | 2 |
| 27-63 | 3 |
| 64-110 | 4 | where the size of UL RBG is the number of contiguous RBs.

The resource allocation (RA) field may include information indicating a combinatorial index (r) used to indicate two resource block (RB) sets, wherein each RB set includes one or more contiguous RBGs, and the combinatorial index (r) is given by the following equation:

$$r = \sum_{i=0}^{M'-1} \binom{N-s_i}{M'-1}, \binom{x}{y} = \begin{cases} \binom{x}{y} & \text{if } x \geq y \\ 0 & \text{if } x < y \end{cases} \quad \text{[Equation]}$$

where M' is 4, N is (number of UL RBGs+1), $s_0$ and $s_1$ are used to indicate a start RBG index and an end RBG index of a first RB set, respectively, and $s_2$ and $s_3$ are used to indicate a start RBG index and an end RBG index of a second RB set, respectively.

The start RBG index and the end RBG index of the first RB set may be denoted by $s_0$ and $s_1-1$, respectively, and the start RB index and the end RBG index of the second RB set may be denoted by $s_2$ and $s_3-1$, respectively.

$\{s_i\}_{i=0}^{M'-1}$ may satisfy $1 \leq s_i \leq N$ and $s_i < s_{i+1}$.

$$\log_2 \left( \binom{\lceil N_{RB}^{UL}/P+1 \rceil}{4} \right)$$

bits indicating the combinatorial index (r) may be contained in a Least Significant Part (LSB) part of the resource allocation (RA) field.

The control channel signal may be a Physical Downlink Control Channel (PDCCH) signal, and the uplink signal may be a Physical Uplink Shared Channel (PUSCH) signal.

Exemplary embodiments of the present invention have the following effects. In accordance with the embodiments of the present invention, resources can be efficiently allocated in a wireless communication system. In more detail, contiguous or non-contiguous resource allocation for uplink transmission can be efficiently carried out.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

FIGS. 11 to 13A and 13B are conceptual diagrams illustrating a non-contiguous uplink resource allocation method according to an embodiment of the present invention.

FIGS. 14 and 15 exemplarily show uplink transmission according to an embodiment of the present invention.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
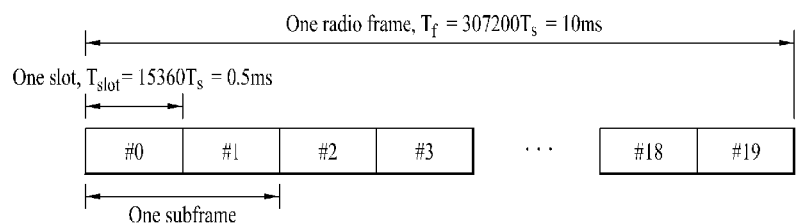
FIG. 1 exemplarily shows a radio frame structure for use in a 3rd Generation Partnership Project (3GPP) system.

FIG. 1 exemplarily shows a radio frame structure for use in a 3rd Generation Partnership Project (3GPP) system.

Referring to FIG. 1, a radio frame includes 10 subframes, and one subframe includes two slots in a time domain. A time required for transmitting one subframe is defined as a Transmission Time Interval (TTI). For example, one subframe may have a length of 1 ms and one slot may have a length of 0.5 ms. One slot may include a plurality of Orthogonal Frequency Division Multiplexing (OFDM) symbols or a Single Carrier Frequency Division Multiple Access (SC-FDMA) symbol in a time domain. Since the LTE system uses OFDMA in downlink and uses SC-FDMA in uplink, the OFDM or SC-FDMA symbol indicates one symbol duration. A resource block (RB) is a resource allocation unit and includes a plurality of contiguous carriers in one slot. The structure of the radio frame is only exemplary. Accordingly, the number of subframes included in the radio frame, the number of slots included in the subframe or the number of symbols included in the slot may be changed in various manners.

Figure 2:
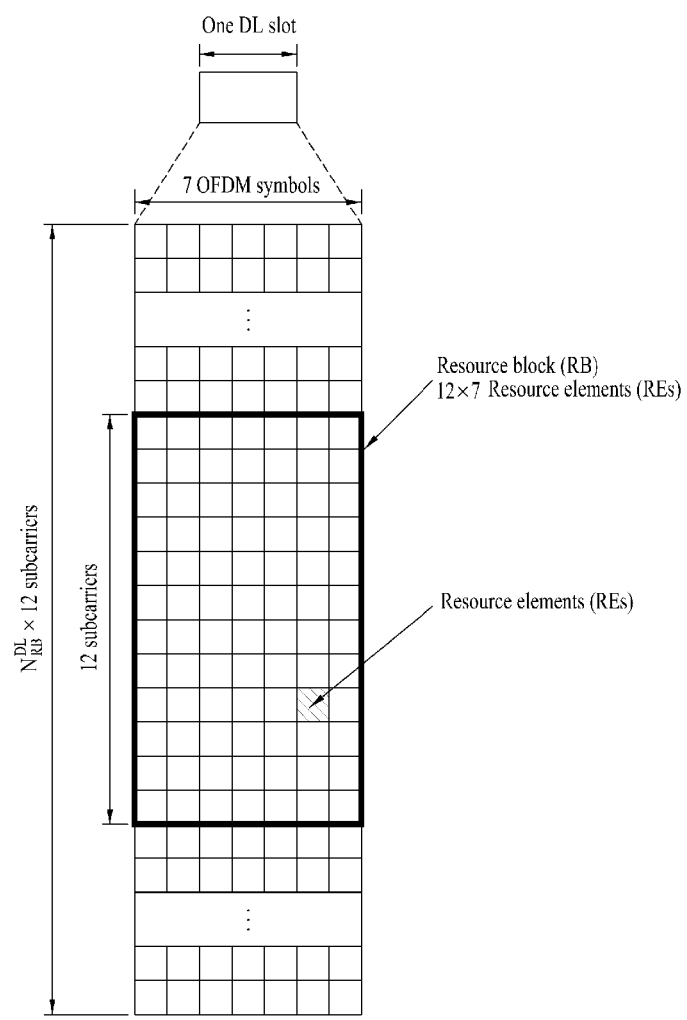
FIG. 2 exemplarily shows a resource grid of a downlink (DL) slot.

FIG. 2 exemplarily shows a resource grid of a downlink slot.

Referring to FIG. 2, a downlink slot includes a plurality of OFDM symbols in a time domain. One downlink slot includes 7 (or 6) OFDM symbols and a resource block (RB) includes 12 subcarriers in a frequency domain. Each element on a resource grid may be defined as a resource element (RE). One RB includes 12×7 (or 12×6) REs. The number ($N_{RB}^{DL}$) of RBs contained in a downlink slot is dependent upon a downlink transmission bandwidth. An uplink slot structure is identical to the downlink slot structure, but OFDM symbols are replaced with SC-FDMA symbols in the uplink slot structure differently from the downlink slot structure, and $N_{RB}^{DL}$ is replaced with $N_{RB}^{UL}$.

Figure 3:
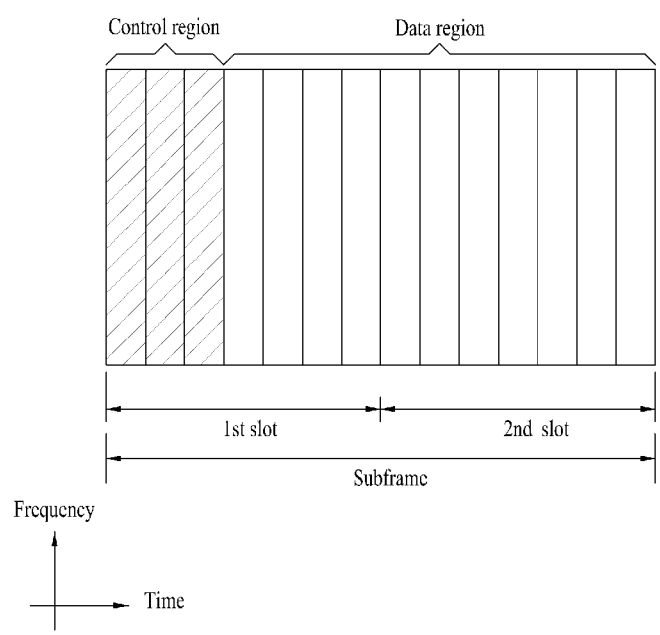
FIG. 3 exemplarily shows a downlink (DL) frame structure.

FIG. 3 is a downlink subframe structure.

Referring to FIG. 3, a maximum of three (or four) OFDM symbols located in the front part of a first slot of the subframe may correspond to a control region to which a control channel is allocated. The remaining OFDM symbols correspond to a data region to which a Physical Downlink Shared Channel (PDSCH) is allocated. A variety of downlink control channels may be used in LTE, for example, a Physical Control Format Indicator Channel (PCFICH), a Physical Downlink Control Channel (PDCCH), a Physical hybrid ARQ indicator Channel (PHICH), etc. PCFICH is transmitted from a first OFDM symbol of the subframe, and carries information about the number of OFDM symbols used for transmitting a control channel within the subframe. PHICH carries a Hybrid Automatic Repeat request acknowledgment/negative-acknowledgment (HARQ ACK/NACK) signal as a response to an uplink transmission signal.

Control information transmitted over a PDCCH is referred to as Downlink Control Information (DCI). DCI includes resource allocation information for either a UE or a UE group and other control information. For example, DCI includes uplink/downlink (UL/DL) scheduling information, an uplink transmission (UL Tx) power control command, etc.

PDCCH carries a variety of information, for example, transmission format and resource allocation information of a downlink shared channel (DL-SCH), transmission format and resource allocation information of an uplink shared channel (UL-SCH), paging information transmitted over a paging channel (PCH), system information transmitted over the DL-SCH, resource allocation information of an upper-layer control message such as a random access response transmitted over PDSCH, a set of Tx power control commands of each UE contained in a UE group, a Tx power control command, activation indication information of Voice over IP (VoIP), and the like. A plurality of PDCCHs may be transmitted within a control region. A user equipment (UE) can monitor a plurality of PDCCHs. PDCCH is transmitted as an aggregate of one or more contiguous control channel elements (CCEs). CCE is a logical allocation unit that is used to provide a coding rate based on a radio channel state to a PDCCH. CCE may correspond to a plurality of resource element groups (REGs). The format of PDCCH and the number of PDCCH bits may be determined according to the number of CCEs. A base station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, an identifier of the corresponding UE (e.g., cell-RNTI (C-RNTI)) may be masked with the CRC. If PDCCH is provided for a paging message, a paging identifier (e.g., paging-RNTI (P-RNTI)) may be masked with a CRC. If PDCCH is provided for system information (e.g., system information block (SIC)), system information RNTI (SI-RNTI) may be masked with CRC. If PDCCH is provided for a random access response, random access-RNTI (RA-RNTI) may be masked with CRC. For example, CRC masking (or scrambling) may perform an XOR operation between CRC and RNTI at a bit level.

Figure 4:
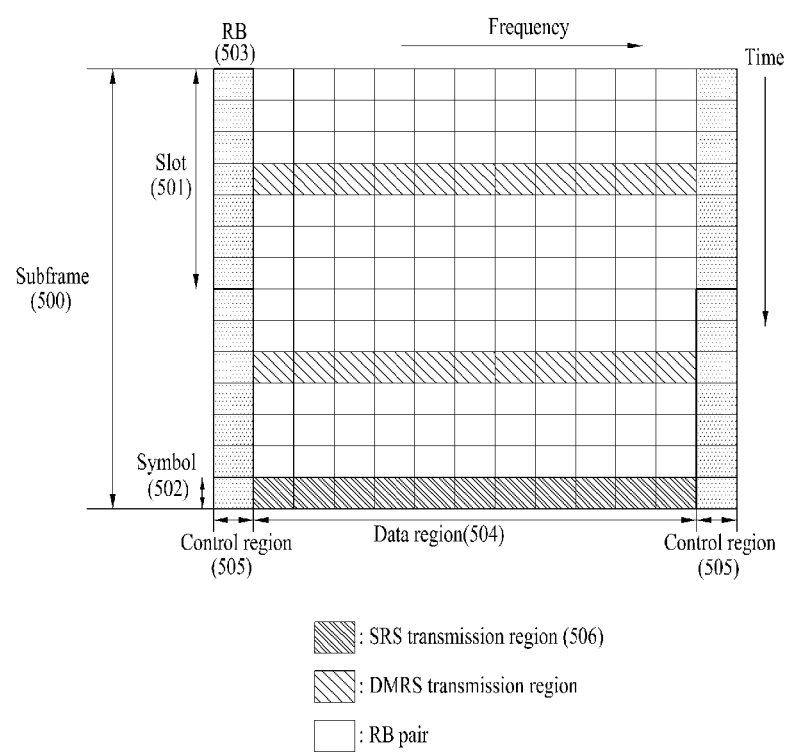
FIG. 4 exemplarily shows an uplink (UL) subframe structure.

FIG. 4 is a diagram showing the structure of an uplink subframe used in LTE.

Referring to FIG. 4, the uplink subframe includes a plurality of slots (e.g., two). The number of SC-FDMA symbols included in one slot may be changed according to the length of a CP. For example, in the case of the normal CP, the slot may include seven SC-FDMA symbols. The uplink subframe is divided into a data region and a control region in a frequency domain. The data region includes a PUSCH and is used to transmit a data signal such as voice data. The control region includes a PUCCH and is used to transmit control information. The PUCCH includes RB pairs (e.g., m=0, 1, 2, 3) located at both ends of the data region on a frequency axis and hops between slots. The control information includes HARQ ACK/NACK, channel quality information (CQI), precoding matrix indicator (PMI), rank indication (RI), etc.

Hereinafter, resource block mapping will be described. A physical resource block (PRB) and a virtual resource block (VRB) are defined. The PRB is equal to that shown in FIG. 2. That is, the PRB is defined as $N_{symb}^{DL}$ contiguous OFDM symbols in a time domain and $N_{sc}^{RB}$ contiguous subcarriers in a frequency domain. PRBs are numbered from 0 to $N_{RB}^{DL}-1$ in the frequency domain. A relationship between a PRB number $n_{PRB}$ and an RE (k, 1) in a slot is shown in Equation 1.

$$n_{PRB} = \left\lfloor \frac{k}{N_{sc}^{RB}} \right\rfloor \quad \text{[Equation 1]}$$

In Equation 1, k denotes a subcarrier index and $N_{sc}^{RB}$ denotes the number of subcarriers included in one RB.

The VRB has the same size as the PRB. A localized VRB (LVRB) of a localized type and a distributed VRB (DVRB) of a distributed type are defined. Regardless of the type of the VRB, a pair of RBs is allocated over two slots by a single VRB number $n_{VRB}$.

Figure 5:
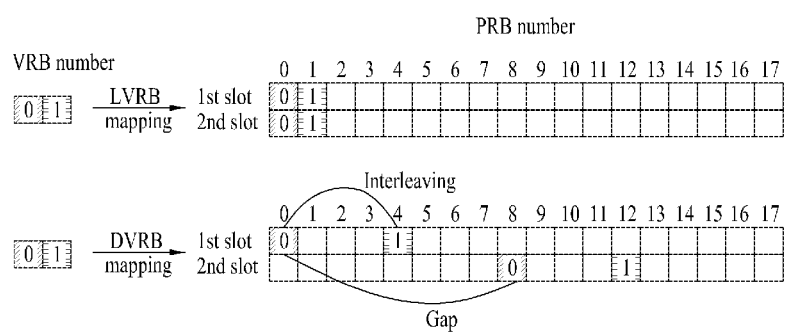
FIG. 5 exemplarily shows mapping between a virtual resource block (VRB) and a physical resource block (PRB).

FIG. 5 is a diagram showing a method of mapping a virtual resource block (VRB) to a physical resource block (PRB).

Referring to FIG. 5, since an LVRB is directly mapped to a PRB, a VRB number $n_{VRB}$ equally corresponds to a PRN number $n_{PRB}$ ($n_{PRB}=n_{VRB}$). The VRB is numbered from 0 to $N_{VRB}^{DL}-1$ and $N_{VRB}^{DL}=N_{RB}^{DL}$. The DVRB is mapped to the PRB after being interleaved. More specifically, the DVRB may be mapped to the PRB as shown in Table 1. Table 1 shows an RB gap value.

TABLE 1

| System BW ($N_{RB}^{DL}$) | Gap ($N_{gap}$) | |
|---|---|---|
| | 1st Gap ($N_{gap.1}$) | 2nd Gap ($N_{gap.2}$) |
| 6-10 | $\lceil N_{RB}^{DL}/2 \rceil$ | N/A |
| 11 | 4 | N/A |

TABLE 1-continued

| System BW ($N_{RB}^{DL}$) | Gap ($N_{gap}$) | |
|---|---|---|
| | 1st Gap ($N_{gap.1}$) | 2nd Gap ($N_{gap.2}$) |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

$N_{gap}$ denotes a frequency gap (e.g., PRB unit) when VRBs having the same number are mapped to PRBs of a first slot and a second slot. In case of $6 \leq N_{RB}^{DL} \leq 49$, only one gap value is defined ($N_{gap}=N_{gap,1}$). In case of $50 \leq N_{RB}^{DL} \leq 110$, two gap values $N_{gap,1}$ and $N_{gap,2}$ are defined. $N_{gap}=N_{gap,1}$ or $N_{gap}=N_{gap,2}$ is signaled through downlink scheduling DVRBs are numbered from 0 to $N_{VRB}^{DL}-1$, is $N_{VRB}^{DL}=N_{VRB,gap1}^{DL}=2 \cdot \min(N_{gap}, N_{RB}^{DL}-N_{gap})$ with respect to $N_{gap}=N_{gap,1}$, and is $N_{VRB}^{DL}=N_{VRB,gap2}^{DL}=\lfloor N_{RB}^{DL}/2N_{gap} \rfloor \cdot 2N_{gap}$ with respect to $N_{gap}=N_{gap,2}$. min(A,B) denotes the smaller of A or B.

Contiguous $\tilde{N}_{VRB}^{DL}$ VRB numbers configure a unit for VRB number interleaving, is $\tilde{N}_{VRB}^{DL}=N_{VRB}^{DL}$ in case of $N_{gap}=N_{gap,1}$, and is $\tilde{N}_{VRB}^{DL}=2N_{gap}$ in case of $N_{gap}=N_{gap,2}$. VRB number interleaving of each interleaving unit may be performed using four columns and $N_{row}$ rows. $N_{row}=\lceil \tilde{N}_{VRB}^{DL}/(4P) \rceil \cdot P$ and P denotes the size of a Resource Block Group (RBG). The RBG is defined by P contiguous RBs. The VRB number is written in a matrix on a row-by-row basis and is read in a column-by-column basis. $N_{null}$ null values are inserted into last $N_{null}/2$ rows of second and fourth columns and $N_{null}=4N_{row}-\tilde{N}_{VRB}^{DL}$. The null value is ignored upon reading.

Hereinafter, a resource allocation scheme defined in the legacy LTE will hereinafter be described in detail. In LTE, frequency resource allocation may be indicated through a PDCCH per subframe. In case of resource allocation, a Physical Resource Block (PRB) of a first half (i.e., a first slot) of a subframe is paired with the same-frequency PRB of a second half (i.e., a second slot). For convenience of description, the present invention will be described in terms of a first half of a subframe. The legacy LTE uses a variety of methods for resource allocation as shown in Tables 2 and 3. Table 2 shows a downlink resource allocation method, and Table 3 shows an uplink resource allocation method.

TABLE 2

| DL RA method | Description | Number of necessary bits |
|---|---|---|
| Type 0: bitmap | Bitmap indicates RBG. RGB size is based on a system band. | $\lceil N_{RB}^{DL}/P \rceil$ |
| Type 1: bitmap | Bitmap indicates RBs within an RBG subset, respectively. The number of subsets is dependent upon a system band. The number of bits is established in the same manner as in Type 0. Therefore, the same DCI format is used to carry Type 0 or Type 1 information. | $\lceil N_{RB}^{DL}/P \rceil$ |
| Type 2: contiguous allocation | This indicates a start position of a resource block and the number of contiguous resource blocks. | $\lceil \log_2 (N_{RB}^{DL}(N_{RB}^{DL}+1)/2) \rceil$ |

TABLE 3

| UL RA method | Description | Number of necessary bits |
|---|---|---|
| Contiguous allocation | This indicates a start position of a resource block and the number of contiguous resource blocks. | $\lceil \log_2 (N_{RB}^{UL}(N_{RB}^{UL}+1)/2) \rceil$ |

Figure 6A:
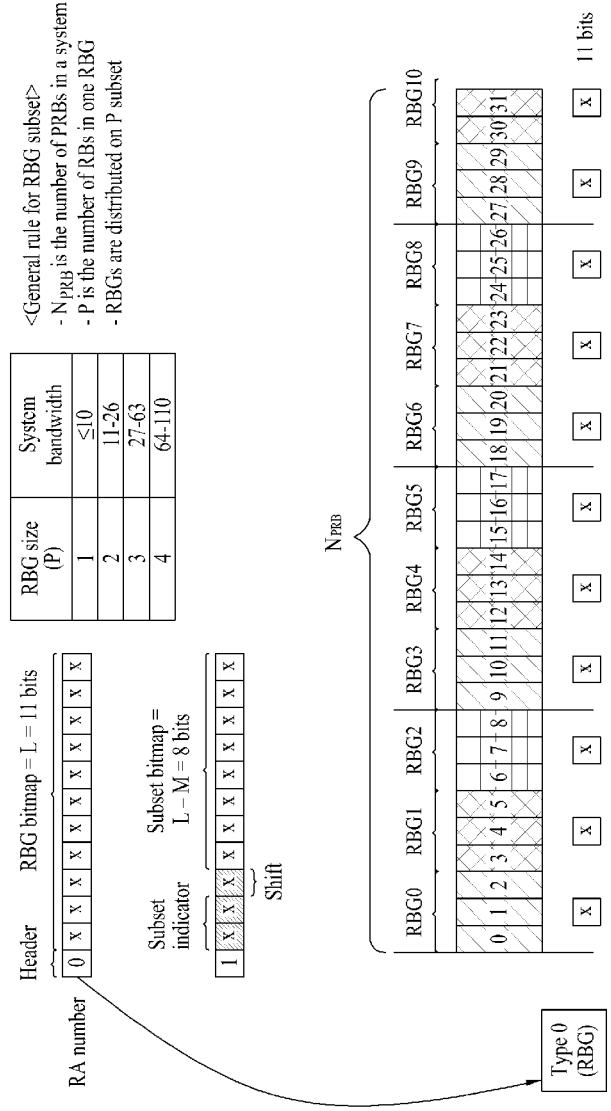
FIGS. 6A to 6C exemplarily show resource allocation types 0~2 of the legacy LTE.
Figure 6B:
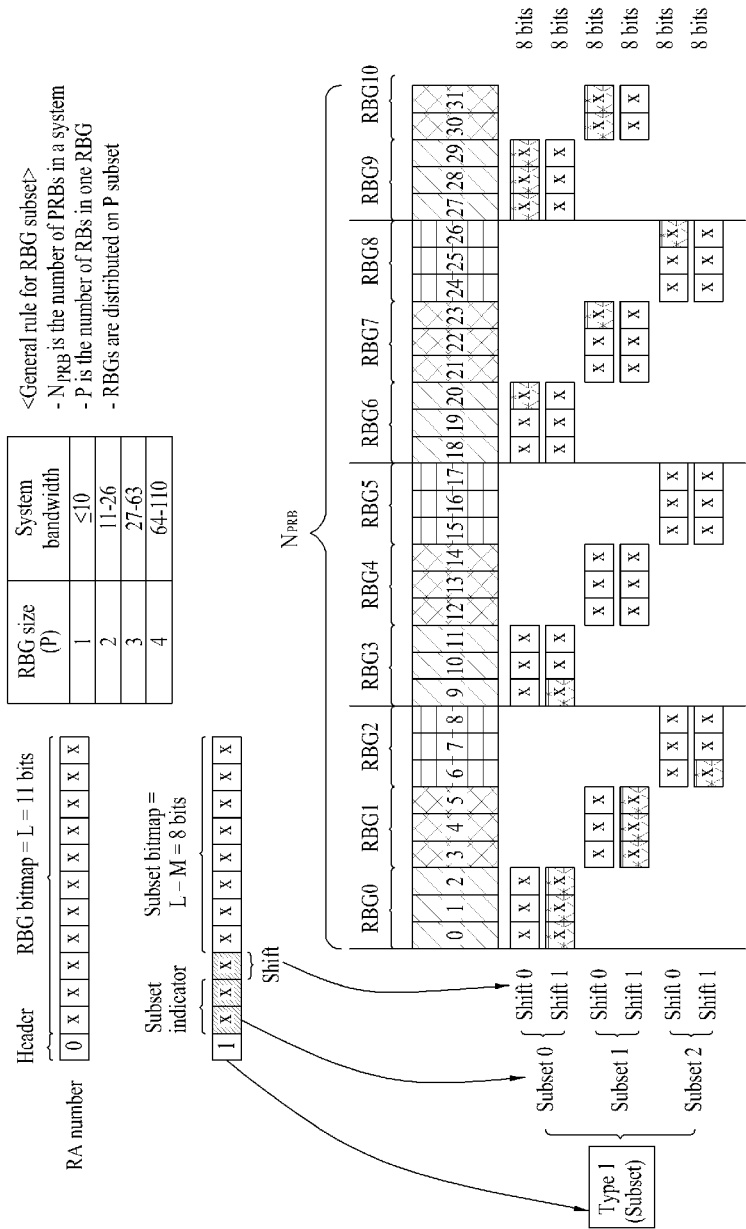
Figure 6C:
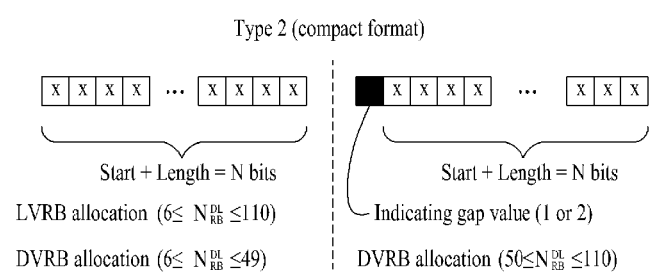

In Tables 2 and 3, $N_{RB}^{DL}$ is a downlink bandwidth denoted by a multiple of $N_{sc}^{RB}$. That is, $N_{RB}^{DL}$ is a downlink bandwidth in units of an RB. Similarly, $N_{RB}^{UL}$ is an uplink bandwidth denoted by a multiple of $N_{sc}^{RB}$. That is, $N_{RB}^{UL}$ is an uplink bandwidth in units of an RB. P is the number of RBs contained in an RBG FIGS. 6A to 6C exemplarily show resource allocation types 0~2 of the legacy LTE. FIG. 6A shows a Type 0 RA (Resource Allocation) control information format and its associated resource allocation example. FIG. 6B shows a Type 1 RA control information format and its associated resource allocation example. FIG. 6C shows a Type 2 RA control information format and its associated resource allocation example.

A user equipment (UE) interprets a resource allocation field based on a detected PDCCH DCI format. The resource allocation field in each PDCCH includes two parts: a resource allocation header field and actual resource block allocation information. PDCCH DCI formats 1, 2 and 2A for Type 0 and Type 1 RA have the same format and are distinguished via a single bit resource allocation header field present according to a downlink system bandwidth. More specifically, Type 0 RA is indicated by 0 and Type 1 RA is indicated by 1. While PDCCH DCI formats 1, 2 and 2A are used for Type 0 or Type 1 RA, PDCCH DCI formats 1A, 1b, 1C and 1D are used for Type 2 RA. The PDCCH DCI format having Type 2 RA does not have a resource allocation header field.

Referring to FIG. 6A, in Type 0 RA, resource block allocation information includes a bitmap indicating an RBG allocated to a UE. The RBG is a set of contiguous PRBs. The size P of the RBG depends on a system bandwidth as shown in Table 4.

TABLE 4

| System Bandwidth $N_{RB}^{DL}$ | RBG Size (P) |
|---|---|
| ≤10 | 1 |
| 11-26 | 2 |
| 27-63 | 3 |
| 64-110 | 4 |

In a downlink system bandwidth having $N_{RB}^{DL}$ PRBs, the total number $N_{RBG}$ of RBGs is $N_{RBG}=\lceil N_{RB}^{DL}/P \rceil$, the size of $\lfloor N_{RB}^{DL}/P \rfloor$ RBGs is P, and the size of one RBG is $N_{RB}^{DL} - P \cdot \lfloor N_{RB}^{DL}/P \rfloor$ in case of $N_{RB}^{DL}$ mod P>0. Mod denotes a modulo operation, $\lceil \ \rceil$ denotes a ceiling function, and $\lfloor \ \rfloor$ denotes a flooring function. The size of a bitmap is $N_{RBG}$ and each bit corresponds to one RBG. All RBGs are indexed by 0 to $N_{RBG}-1$ in a frequency increase direction and RBG 0 to RBG $N_{RBG}-1$ are mapped from a most significant bit (MSB) to a least significant bit (LSB) of a bitmap.

Referring to FIG. 6B, in Type 1 RA, resource block allocation information having the size of $N_{RBG}$ informs a scheduled UE of resources in an RBG subset in PRB units. The RBG subset p (0≤p<P) starts from an RBG p and includes every P-th RBG The resource block allocation information includes three fields. A first field has $\lceil \log_2(P) \rceil$ bits and indicates an RBG subset selected from among P RBG subsets. A second field has 1 bit and indicates resource allocation span shift within a subset. Shift is triggered if a bit value is 1 and is not triggered if a bit value is 0. A third field includes a bitmap and each bit indicates one PRB within a selected RBG set. The size of a bitmap part used to indicate a PRB within the selected RBG subset is $N_{RB}^{TYPE1}$ and is defined by Equation 2.

$$N_{RB}^{TYPE1} = \lceil N_{RB}^{DL}/P \rceil - \lceil \log_2(P) \rceil - 1 \qquad \text{[Equation 2]}$$

An addressable PRB number in the selected RBG subset may start from an offset $\Delta_{shift}(p)$ from a smallest PRB number within the selected RBG subset and may be mapped to a MSB of a bitmap. The offset is represented by the number of PRBs and is applied within the selected RBG subset. If the bit value within a second field for resource allocation span shift is set to 0, an offset for an RBG subset p is $\Delta_{shift}(p)=0$. In the other case, an offset for an RBG subset p is $\Delta_{shift}(p)=N_{RB}^{RBG\ subset}(p) - N_{RB}^{TYPE1}$. $N_{RB}^{RBG\ subset}(p)$ denotes the number of PRBs within the RBG subset p and may be obtained by Equation 3.

$$N_{RB}^{RBGsubset}(p) = \qquad \text{[Equation 3]}$$

$$\begin{cases} \left\lfloor \frac{N_{RB}^{DL}-1}{P^2} \right\rfloor \cdot P + P & , p < \left\lfloor \frac{N_{RB}^{DL}-1}{P} \right\rfloor \bmod P \\ \left\lfloor \frac{N_{RB}^{DL}-1}{P^2} \right\rfloor \cdot P + (N_{RB}^{DL}-1) \bmod P + 1 & , p < \left\lfloor \frac{N_{RB}^{DL}-1}{P} \right\rfloor \bmod P \\ \left\lfloor \frac{N_{RB}^{DL}-1}{P^2} \right\rfloor \cdot P & , p < \left\lfloor \frac{N_{RB}^{DL}-1}{P} \right\rfloor \bmod P \end{cases}$$

Referring to FIG. 6C, in Type 2 RA, resource block allocation information indicates an LVRB or DVRB set contiguously allocated to a scheduled UE. If resource allocation is signaled in PDCCH DCI format 1A, 1B or 1C, a 1-bit flag indicates whether an LVRB or DVRB is allocated (e.g., 0 denotes LVRB allocation and 1 denotes DVRB allocation). In contrast, if resource allocation is signaled in PDCCH DCI format 1C, only DVRB is always allocated. A Type 2 RA field includes a resource indication value (RIV) and the RIV corresponds to a start resource block $RB_{start}$ and a length. The length denotes the number of virtually and contiguously allocated resource blocks.

Figure 7A:
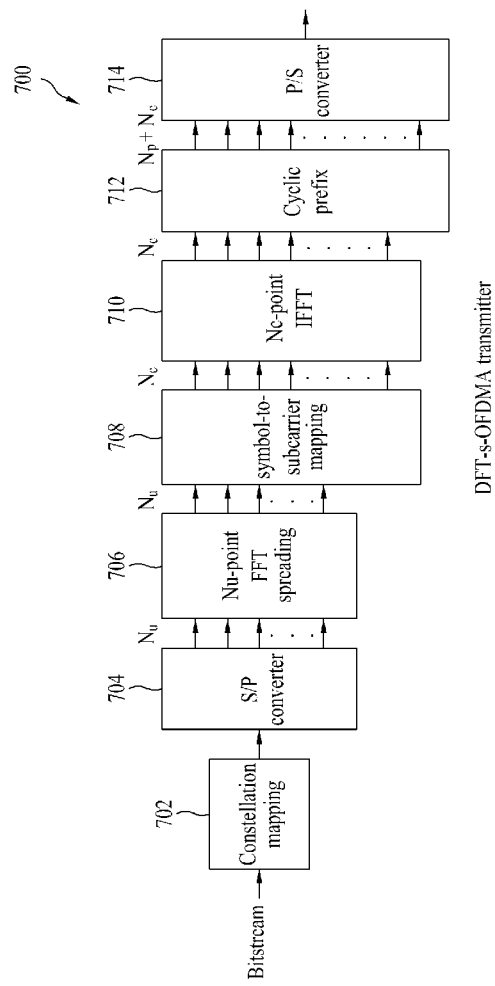
FIGS. 7A and 7B are block diagrams illustrating a Discrete Fourier Transform Spread Orthogonal Frequency Division Multiple Access (DFT-s-OFDMA) transmitter and receiver.
Figure 7B:
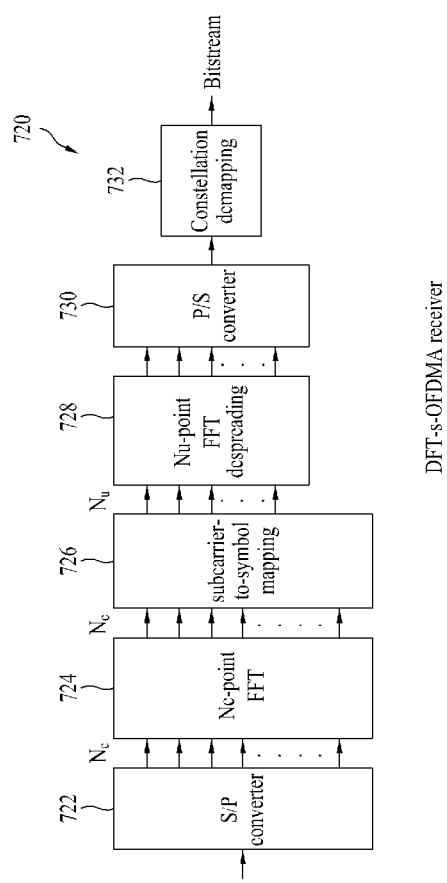

FIGS. 7A and 7B are block diagrams illustrating a Discrete Fourier Transformation spread Orthogonal Frequency Division Multiple Access (DFT-s-OFDMA) transmitter and a DFT-s-OFDMA receiver. The DFT-s-OFDMA scheme is different from the OFDMA scheme, because the DFT-s-OFDMA scheme spreads a plurality of data symbols (i.e., a data symbol sequence) over a frequency domain before performing IFFT processing, differently from the OFDMA scheme. The DFT-s-OFDMA scheme may also be referred to as an SC-FDMA scheme. For convenience of description and better understanding of the present invention, the DFT-s-OFDMA scheme and the SC-FDMA may be used together as necessary.

Referring to FIG. 7a, a DFT-s-OFDMA transmitter 700 includes a constellation mapping module 702, a Serial/Parallel (S/P) converter 704, a $N_u$-point FFT spreading module 706, a symbol to subcarrier mapping module 708, an $N_c$-point IFFT module 710, a cyclic prefix module 712, and a Parallel/Serial (P/S) converter 714. The above-mentioned modules are disclosed only for illustrative purposes, and the DFT-s-OFDMA transmitter 700 may further include additional modules. If necessary, some modules among the above-mentioned modules may be integrated into one function, so that the modules may also be integrated into one module. In this case, $N_u$ is an FFT spreading module input size, and means the number of scheduled subcarriers. $N_c$ means the total number of subcarriers existing in the system bandwidth (system BW). Accordingly, an $N_u$ value and its associated DFT Input/Output (I/O) size may be variable within the range of $N_u \leq N_c$ according to the amount of data symbols scheduled at each scheduling time.

A signal processing step for the DFT-s-OFDMA transmitter 700 will hereinafter be described in detail. Firstly, a bit stream is modulated into a data symbol sequence by the constellation mapping module 702. After that, a serial data symbol sequence is converted into $N_u$ parallel data symbol sequences by the S/P converter 704. The $N_u$-length parallel data symbol sequences are converted into $N_u$-length frequency domain sequences through the same-sized FFT processing by the $N_u$-point FFT spreading module 706. The FFT process may be carried out by the $N_u$-point DFT processing. In the embodiments of the present invention, FFT and DFT may be used together as necessary, and a DFT process may be used together with DFT spreading or DFT precoding. After that, the $N_u$-length frequency domain sequences are mapped to $N_u$ subcarriers allocated from among a total of $N_c$ subcarriers, and the $N_c-N_u$ remaining subcarriers are each padded with '0' by the symbol to subcarrier mapping module 708. Sequences mapped to $N_c$ subcarriers are converted into $N_c$-length time domain sequences by the $N_c$-point IFFT module 710. In order to reduce Inter-Symbol Interference (ISI) and Inter-Carrier Interference (ICI), the last $N_p$ samples from among time domain sequences are copied and attached to the front of the time domain sequences so as to configure a cyclic prefix (CP) by the cyclic prefix module 712. The generated time domain sequences may correspond to one transmission symbol, and may be converted into a serial sequence by the P/S converter 714. After that, the serial sequence is transmitted to a receiver through frequency up-conversion or the like. Another UE (i.e., the latter UE) receives available subcarriers from among the $N_c$-$N_u$ remaining subcarriers that have been left after being used by the former UE, so that the latter UE transmits data using the allocated available subcarriers.

Referring to FIG. 7B, a receiver 720 includes an S/P converter 722, an Nc-point FFT module 724, a subcarrier to symbol mapping module 726, an $N_u$-point DFT despreading module 728, a P/S converter 730, and a constellation mapping module 732. The signal processing steps of the receiver 720 are arranged in opposite order of those of the transmitter 700 and as such a detailed description thereof will be described by referring to FIG. 7A.

The LTE uses the OFDMA scheme on downlink whereas it uses the SC-FDMA scheme on uplink. If the $N_u$-point FFT spreading module 706 is removed from the block diagram of FIG. 7A, the OFDMA transmitter can be achieved. If the $N_u$-point DFT despreading module 728 is removed from the block diagram of FIG. 7B, the OFDMA receiver can be achieved.

Figure 8:
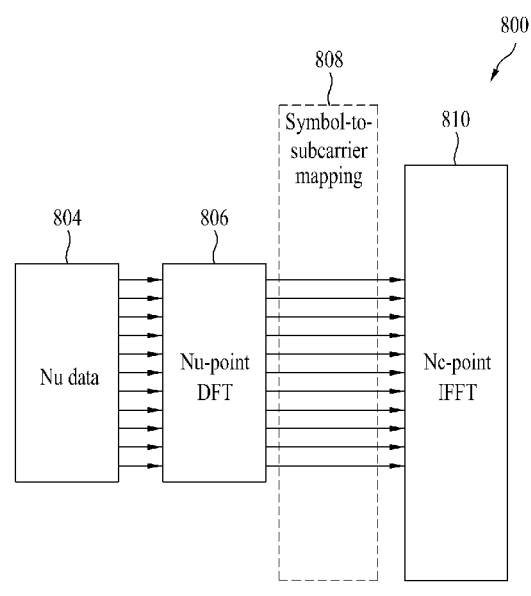
FIG. 8 is a conceptual diagram illustrating localized DFT-s-OFDMA resource mapping.
Figure 9:
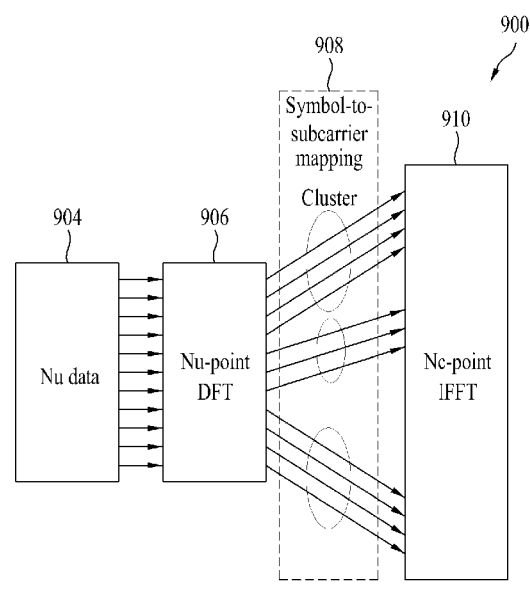
FIG. 9 is a conceptual diagram illustrating clustered DFT-s-OFDMA resource mapping.

FIG. 8 is a conceptual diagram illustrating localized DFT-s-OFDMA resource mapping. FIG. 9 is a conceptual diagram illustrating clustered DFT-s-OFDMA resource mapping. A method for mapping a frequency-domain sequence generated by DFT precoding to a subcarrier will hereinafter be described with reference to FIGS. 8 and 9. The legacy LTE has been designed to allocate only one contiguous frequency resource to one UE on uplink. However, the LTE-A (since Rel-10) system can allocate one contiguous frequency resource to one UE on uplink, and can also allocate a plurality of non-contiguous frequency resources to one UE on uplink, so that frequency resource utilization and the demand of high-speed communication can be maximized.

FIG. 8 is a block diagram illustrating an example of a localized DFT-s-OFDMA transmitter. FIG. 8 shows a resource allocation method of the legacy LTE. In other words, a frequency domain sequence having a length of $N_u$ is mapped to $N_u$ contiguous subcarriers. The localized DFT-s-OFDMA scheme can transmit data only through consecutive subcarriers at a given time, so that flexibility of scheduling may be unavoidably deteriorated. For example, when a transmitter and a receiver have good radio channel response characteristics in a plurality of frequency domains spaced apart from each other at a certain time, it is impossible for the localized DFT-s-OFDMA scheme of FIG. 8 to simultaneously transmit data to the plurality of frequency domains spaced apart from each other.

FIG. 9 is a block diagram illustrating an example of a clustered DFT-s-OFDMA transmitter. FIG. 9 shows a resource allocation method additionally used in LTE-A. The LTE-A UE can use the scheme of FIG. 8 or the scheme of FIG. 9 on the basis of resource allocation information.

Referring to FIG. 9, frequency domain sequences generated from the DFT module 906 are non-contiguously mapped to a frequency band at irregular intervals by the symbol to subcarrier mapping module 908. It can be recognized that the clustered DFT-s-OFDMA scheme of FIG. 9 is implemented when the localized DFT-s-OFDMA scheme is independently applied to a plurality of frequency domains spaced apart from each other. Each frequency band (or each resource set) to which the localized DFT-s-OFDMA scheme is applied is referred to as a cluster. The cluster includes one or more consecutive subcarriers. Accordingly, in the scheme of FIG. 9, a plurality of DFT-precoded data symbols are mapped to consecutive subcarriers contained in each of M clusters (M≥1) separated from each other on a frequency axis. FIG. 9 exemplarily shows the case of three clusters. The sizes of respective clusters (i.e., the number of subcarriers) may be equal to each other or may be independently established. If M is equal to or higher than 1, a PAPR value of the transmission signal becomes higher than that of the localized DFT-s-OFDMA scheme. In contrast, if M is set to a specific value within an appropriately small range, a PAPR less than that of the OFDMA scheme is still guaranteed and scheduling flexibility can be improved according to the clustered DFT-s-OFDMA scheme of FIG. 9.

Embodiment

Since the non-contiguous uplink resource allocation (for convenience of description, referred to as UL RA Type 1) method has been introduced to the LTE-A system, a variety of methods for efficiently signaling UL RA Type 1 have been intensively discussed in the technology.

Firstly, there is proposed a first scheme configured to employ a bitmap designed to individually indicate UL RB (or RBG) in the same manner as in DL RA Type 0. In accordance with the present invention, although perfect scheduling freedom is guaranteed, an n-bit RA field is needed when n RBs (or n RBGs) are present in a UL band so that the amount of control information can be excessively increased. Moreover, considering that the size of RA field for conventional PUSCH scheduling is fixed to $\lceil \log_2(N_{RB}^{UL}+1)/2) \rceil$, a new DCI format for supporting the first scheme must be defined.

Secondly, there is proposed a method for reusing a conventional contiguous allocation scheme (RA Type 2) and limiting a resource region to which each cluster can be allocated. For example, provided that the UL band includes 10 RBGs, a first cluster can be allocated only to RBGs 0~4 and a second cluster can be allocated only to RBGs 5~9. in this case, the RA field may have the size of $2 \cdot \lceil \log_2(N_{RBG}^{Cluster\ Span} \cdot (N_{RBG}^{Cluster\ Span}+1)/2) \rceil$. $N_{RBG}^{Cluster\ Span}$ is the size of a specific region to which each cluster can be allocated, and is denoted in units of an RBG In accordance with the second scheme, it may be possible to perform non-contiguous resource allocation using the legacy RA field according to adjustment of the size of $N_{RBG}^{Cluster\ Span}$. However, since the region to which each cluster can be allocated is limited, the scheduling freedom can be reduced.

As described above, when using a bitmap indicating an individual RB (or RBG) in case of non-contiguous UL resource allocation, the amount of control information can be greatly increased so that it is impossible to reuse the legacy DCI format. In addition, when using the legacy contiguous allocation scheme (i.e., RIV) or DCI format in case of non-contiguous UL resource allocation, the size of a region capable of being used for cluster allocation is limited to maintain the legacy DCI format size, resulting in reduction of scheduling freedom.

A non-contiguous UL resource allocation method capable of guaranteeing scheduling freedom without increasing the amount of resource allocation information will hereinafter be described with reference to the attached drawings. In more detail, the present invention proposes a method for using a combinatorial index corresponding to a plurality of non-contiguously allocated resource sets. The combinatorial index may be contained in an RA field of a DCI format for PUSCH scheduling. The combinatorial index may be used to indicate a specific case in which indices of a specific combination are selected from among all cases. For convenience of description, a set of a specific combinatorial index is denoted by $\{s_i\}_{i=0}^{M'-1}$. M' is identical to 2M (M'=2M), where M is the number of allocated resource sets (e.g., clusters). In this case, $\{s_0,s_1\}$ corresponds to a first resource set, and $\{s_2,s_3\}$ corresponds to a second resource set. That is, $\{s_{2m-2},s_{2m-1}\}$ corresponds to a m$^{th}$ resource set (where m=1, 2, . . . , M). Correspondence relationship may be defined in different ways. A resource allocation method using the combinatorial index will be described later.

Prior to describing the following description, either a total UL system bandwidth or a total number of RBs corresponding to a UL bandwidth available for resource allocation is defined as $N_{RB}^{UL}$. For convenience of description, although the embodiment of the present invention uses an RBG as a minimum resource allocation unit (i.e., granularity), the scope or spirit of the present invention is not limited thereto, and the minimum resource allocation unit may be defined in different ways. Provided that the number of RBs contained in an RBG is P (P=1, 2, . . . ), a total of $N_{RBG}^{UL}$ resource allocation RBGs can be defined for a total of $N_{RB}^{UL}$ RBs. In more detail, $N_{RBG}^{UL}$ may be denoted by $\lceil N_{RB}^{UL}/P \rceil$ (or, ceiling ($N_{RB}^{UL}/P$)). $\lceil x \rceil$ or ceiling(x) is a minimum integer equal to or greater than x. Meanwhile, according to definition and size of the resource allocation field, $N_{RBG}^{UL}$ may be denoted by $\lfloor N_{RB}^{UL}/P \rfloor$ (or, floor ($N_{RB}^{UL}/P$)) or round ($N_{RB}^{UL}/P$). $\lfloor x \rfloor$ or floor(x) is a maximum integer equal to or less than x. round(x) represents the rounded value of x.

In addition, the number of resource sets (e.g., RBG clusters) non-contiguously allocated to the UE is defined by M (M=2, 3, . . . ). M may be set as a value common to all UEs (i.e., a cell-specific value) or may be set as an independent value for each UE (i.e., a UE-specific value). Preferably, M may be fixed to 2 (i.e., M=2) for all UEs.

Figure 10:
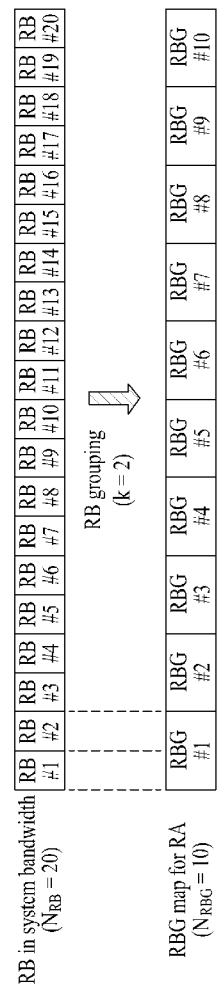
FIG. 10 exemplarily shows RBG grouping.

FIG. 10 exemplarily shows an RBG map based on RBG indexing for resource allocation. In FIG. 10, it is assumed that the UL band includes 20 RBs ($N_{RB}^{UL}$=20). Here, RBG includes two RBs as shown in Table 4. Therefore, RBs #1~#20 are grouped into RBGs #1~#10. In the following description, RBG is used as a basic UL resource allocation unit. Although FIG. 10 shows that the RB index or the RBG index starts from 1, an RB index and/or an RBG index may start from 0 according to an implementation example.

Method 1: A Combination of RBG Indexes is Indicated by a Combinatorial Index

Method 1 relates to a method for allocating a plurality of non-contiguous UL resource sets (e.g., RBG clusters) on the basis of RBG indexing. For convenience of description, a start RBG index of the RBG cluster allocated to the UE is denoted by S, and an end RBG index thereof is denoted by E. The start RBG index of the m-th RBG set is denoted by $S_m$, and the end RBG index thereof is denoted by $E_m$. For convenience of description, the following description will focus upon an exemplary case in which two RBG clusters are allocated. In this case, the combinatorial index may be used to indicate $\{s_i\}_{i=0}^{M'-1}$ (M'=4).

For resource allocation, $\{s_0,s_1\}=\{S_1,E_1\}$ or $\{s_2,s_3\}=\{S_2,E_2\}$ may be defined. However, considering that the RBG cluster is composed of one RBG the combinatorial index needs to indicate a combination of $s_0=s_1$ and/or $s_2=s_3$. In this case, a total number of combinations is increased due to duplicate selection, so that much more control information may be needed. In order to exclude duplicate selection, limitation of $s_i<s_{i+1}$ may be used. However, in case of using the limitation of $s_i<s_{i+1}$, it may be impossible to allocate a resource set composed of one RBG. Therefore, the following methods may be used.

Method 1-1: $\{s_0,s_1\}=\{S_1,E_1+1\}$, $\{s_2,s_3\}=\{S_2,E_2+1\}$
Method 1-2: $\{s_0,s_1\}=\{S_1-1,E_1\}$, $\{s_2,s_3\}=\{S_2-1,E_2+1\}$ In Method 1-1, the RBG index of the allocated resource set is denoted by $\{S_m, E_m\}=\{s_{2m-2},s_{2m-1}-1\}$ (where, m=1, 2, . . . , M). Similarly, according to Method 1-2, the RBG index of the allocated resource set is denoted by $\{S_m, E_m\}=\{s_{2m-2}+1,s_{2m-1}\}$.

Method 1-1 and Method 1-2 will hereinafter be described with reference to the attached drawings.

Method 1-1) Start/End-Rear RBG Indication of RBG Clusters

Figure 11:
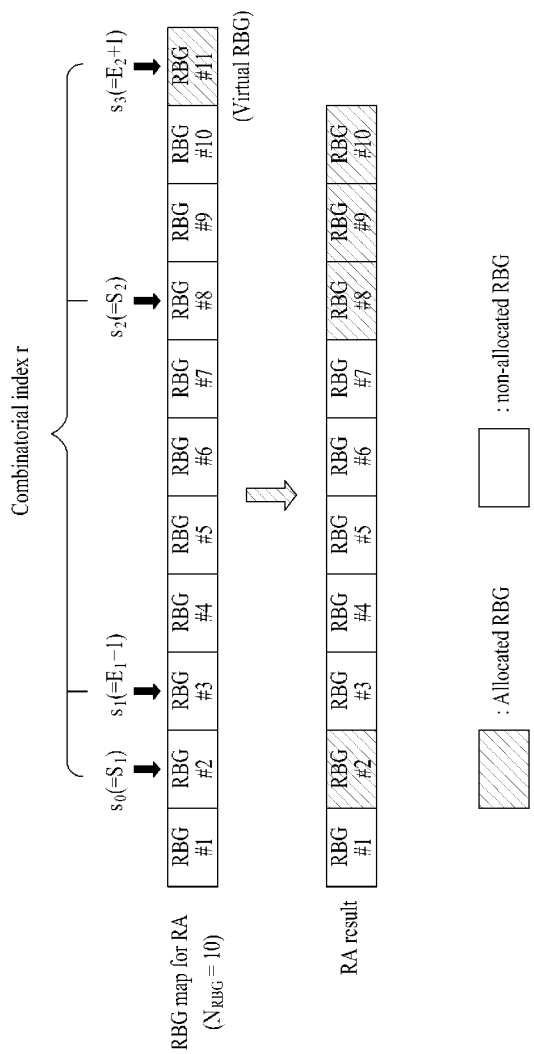

FIG. 11 shows exemplary resource allocation of Method 1-1.

Referring to FIG. 11, Method 1-1 is based on RBG indexing, $\{S_m,E_m+1\}$ (i.e., a start RBG index and an end-rear RBG index) is notified to each of M RBG clusters allocated to the UE from among a total of $N_{RBG}$ RBGs. As described above, a combinatorial index (also called a combinatorial index) contained in a DCI format for PUSCH scheduling indicates $\{s_i\}_{i=0}^{M'-1}$(M'=2M), and the UE may confirm $\{S_m,E_m\}$ on the basis of $\{s_{2m-2},s_{2m-1}\}=\{S_m,E_m+1\}$.

In Method 1-1, it is possible to define one additional virtual RBG at the rear side of (i.e., at a higher RBG index side) of the end RBG index as shown in FIG. 11 so as to allow the end RBG of the RBG cluster to be allocated to the end RBG index. In case of virtual RBG, it is impossible to perform actual resource allocation, or the virtual RBG may be used only for indexing as necessary.

In Method 1-1, 2M (=M') indices for allocation of M RBG clusters may be encoded into different bits or may be encoded into different bits of individual clusters, or all indices of all clusters may be joint-encoded together in order to reduce the number of bits required for resource allocation. In addition, as described above, only a non-overlapping index combination may be selected and signaled from among the 2M (=M') indices for discriminating M RBG clusters. For the sake of convenience, when it is assumed that N=$N_{RBG}$, the total number of RBG indices includes the virtual RBG such that the total number of RBG indices is N+1 and therefore the number of bits required for resource allocation in Method 1-1 is ceiling($\log_2(_{N+1}C_{2M})$). More specifically, when N+1 RBG indices (i.e., RBG indices 1 to N+1) are defined in Method 1-1, a combinatorial index (r) for signaling resource allocation of M RBG clusters may be represented by the following equation 4.

$$r = \sum_{i=0}^{M'-1} \binom{(N+1)-s_i}{M'-1}, \binom{x}{y} = \begin{cases} \binom{x}{y} & \text{if } x \geq y \\ 0 & \text{if } x < y \end{cases} \quad \text{[Equation 4]}$$

In Equation 4, $\{s_i\}_{i=0}^{M'-1}$ (1≤$s_i$≤N+1, $s_i<s_{i+1}$) denotes M'(=2M) sorted RBG indices, and $$\binom{x}{y}$$

is denoted by $$\frac{x(x-1) \ldots (x-y+1)}{y(y-1) \ldots 1} = \frac{x!}{(x-y)!y!}.$$

In another scheme, when N+1 RBG indices (i.e., RBG indices 0 to N) are defined, a combinatorial index r for signaling resource allocation of M RBG clusters may be expressed by the following equation 5.

$$r = \sum_{i=0}^{M'-1} \binom{N-s_i}{M'-i}, \binom{x}{y} = \begin{cases} \binom{x}{y} & \text{if } x \geq y \\ 0 & \text{if } x < y \end{cases}$$ [Equation 5]

Here, $\{s_i\}_{i=0}^{M'-1}$ ($0 \leq s_i \leq N$, $s_i < s_{i+1}$) denotes $M'(=2M)$ sorted RBG indices, and $$\binom{x}{y}$$

is denoted by $$\frac{x(x-1)\ldots(x-y+1)}{y(y-1)\ldots 1}$$

In Equations 4 and 5, N may be given by the following equation 6.

$$[N_{RB}^{UL}/P]+1$$ [Equation 6]

Here, $N_{RB}^{UL}$ is the number of resource blocks (RBs) of a UL band. P is the number of RBs contained in RBG ⌈ ⌉ is a ceiling.

Table 5 exemplarily shows the RBG size (P) depending upon a system band.

TABLE 5

| System bandwidth $N_{RB}^{UL}$ | RBG size (P) |
|---|---|
| ≤10 | 1 |
| 11-26 | 2 |
| 27-63 | 3 |
| 64-110 | 4 |

In addition, $\{E_m+1\}=\{s_{2m-1}\}$ may be interpreted as a start RBG index of a non-allocation RBG region adjacent to a rear portion of the m-th RBG cluster.

Method 1-2) Start-Front/End RBG Indication of RBG Clusters

Figure 12:
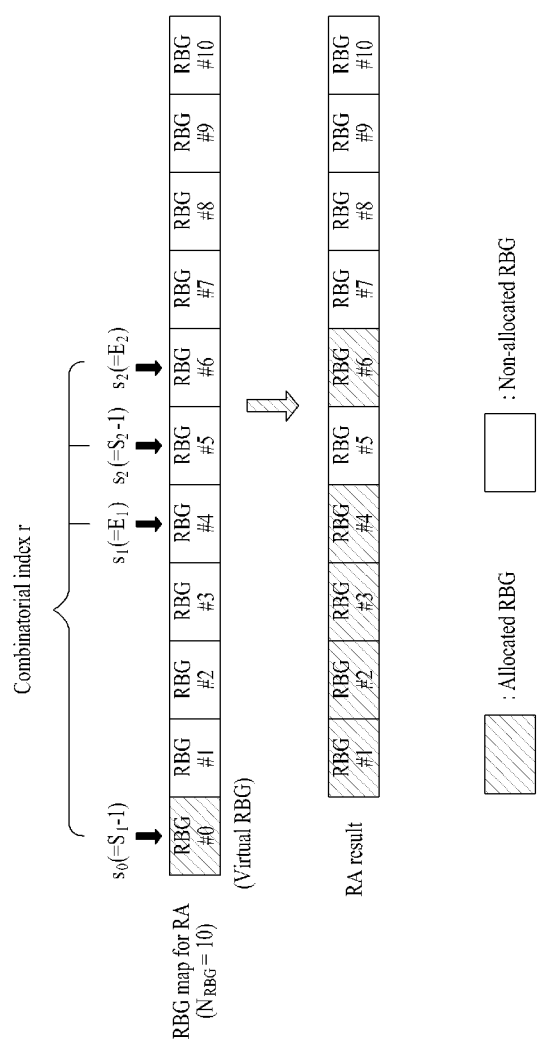

FIG. 12 shows exemplary resource allocation of Method 1-1.

Referring to FIG. 12, Method 1-2 is based on RBG indexing, $\{S_m-1, E_m\}$ (i.e., a start-front RBG index and an end RBG index) is notified to each of M RBG clusters allocated to the UE from among a total of $N_{RBG}$ RBGs. As described above, a combinatorial index (also called a combinatorial index) contained in a DCI format for PUSCH scheduling indicates $\{s_i\}_{i=0}^{M'-1}$ (M'=2M), and the UE may confirm $\{S_m, E_m\}$ on the basis of $\{s_{2m-2}, s_{2m-1}\}=\{S_m-1, E_m\}$.

In Method 1-2, it is possible to define one additional virtual RBG at the front side of (i.e., at a lower RBG index side) of the first RBG index as shown in FIG. 12 so as to allow the end RBG of the RBG cluster to be allocated to the end RBG index. In case of virtual RBG it is impossible to perform actual resource allocation, or the virtual RBG may be used only for indexing as necessary.

In Method 1-2, 2M (=M') indices for allocation of M RBG clusters may be encoded into different bits or may be encoded into different bits of individual clusters, or all indices of all clusters may be joint-encoded together in order to reduce the number of bits required for resource allocation. In addition, as described above, only a non-overlapping index combination may be selected and signaled from among the 2M (=M') indices for discriminating M RBG clusters. For the sake of convenience, when it is assumed that $N=N_{RBG}$, the total number of RBG indices includes the virtual RBG such that the total number of RBG indices is N+1 and therefore the number of bits required for resource allocation in Method 1-1 is ceiling($\log_2({}_{N+1}C_{2M})$).

More specifically, when N+1 RBG indices (i.e., RBG indices 1 to N+1) are defined in Method 1-2, a combinatorial index (r) for signaling resource allocation of M RBG clusters may be represented by the following equation 4. In addition, when N+1 RBG indices (i.e., RBG indices 1 to N+1) are defined in Method 1-2, a combinatorial index (r) for signaling resource allocation of M RBG clusters can be represented by Equation 5.

In Method 1-2, $\{S_m-1\}=\{s_{2m-2}\}$ may be interpreted as the end RBG index of a non-allocation RBG region adjacent to a front portion of the m-th RBG cluster.

Method 2: Combination of RBG Borders is Indicated by Combinatorial Index

Method 2 relates to a method for allocating a plurality of non-contiguous UL resource sets (e.g., RBG clusters) on the basis of RBG border indexing. For convenience of description, a start RBG border index and an end RBG border index of an RBG cluster allocated to a UE are denoted by SB and EB, respectively. The start RBG border index and the end RBG border index of the m-th RBG set are denoted by $SB_m$ and $EB_m$, respectively. For convenience of description, a detailed description of Method 2 will focus upon an exemplary case in which two RBG clusters are allocated. In this case, a combinatorial index may be used to indicate $\{s_i\}_{i=0}^{M'-1}$ (M'=4).

Figure 13A:
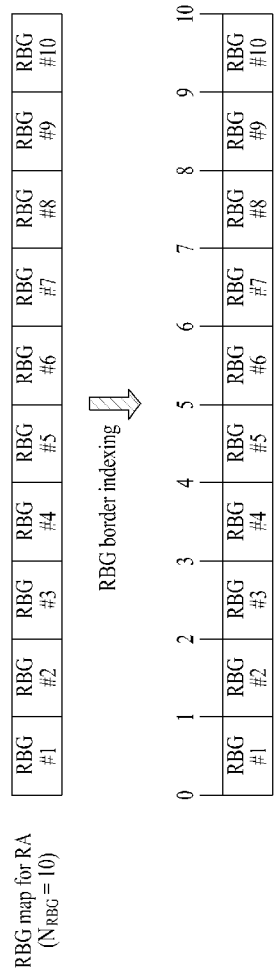
Figure 13B:
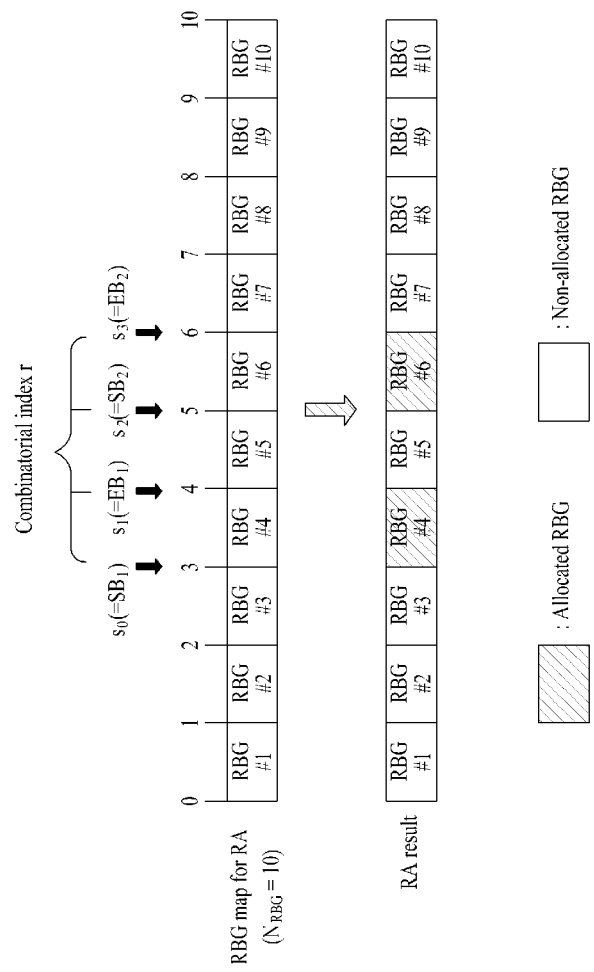

FIGS. 13A and 13B exemplarily show resource allocation based on Method 2.

Referring to FIGS. 13A and 13B, Method 2 is based on RBG indexing, $\{SB_m, EB_m\}$ (i.e., a start RBG border index and an end RBG border index) is notified to each of M RBG clusters allocated to the UE from among a total of $N_{RBG}$ RBGs. As described above, a combinatorial index (also called a combinatorial index) contained in a DCI format for PUSCH scheduling indicates $\{s_i\}_{i=0}^{M'-1}$ (M'=2M), and the UE may confirm $\{SB_m, EB_m\}$ on the basis of $\{s_{2m-2}, s_{2m-1}\}=\{SB_m, EB_m\}$.

In Method 2, 2M (=M') indices for allocation of M RBG clusters may be encoded into different bits or may be encoded into different bits of individual clusters, or all indices of all clusters may be joint-encoded together in order to reduce the number of bits required for resource allocation. In addition, as described above, only a non-overlapping index combination may be selected and signaled from among the 2M (=M') indices for discriminating M RBG clusters. For the sake of convenience, when it is assumed that $N=N_{RBG}$, a total number of RBG indices is N+1 and therefore the number of bits required for resource allocation in Method 2 is ceiling($\log_2({}_{N+1}C_{2m})$).

More specifically, when N+1 RBG indices (i.e., RBG indices 1 to N+1) are defined in Method 2, a combinatorial index (r) for signaling resource allocation of M RBG clusters may be represented by the following equation 7.

$$r = \sum_{i=0}^{M'-1} \binom{N-s_i}{M'-i}, \binom{x}{y} = \begin{cases} \binom{x}{y} & \text{if } x \geq y \\ 0 & \text{if } x < y \end{cases} \quad \text{[Equation 7]}$$

In Equation 7, $\{s_i\}_{i=0}^{M'-1} (1 \leq s_i \leq N+1, s_i < s_{i+1})$ denotes M'(=2M) sorted RBG indices, and $$\binom{x}{y}$$

is denoted by $$\frac{x(x-1)\ldots(x-y+1)}{y(y-1)\ldots 1}.$$

In another scheme, when N+1 RBG indices (i.e., RBG indices 0 to N) are defined, a combinatorial index r for signaling resource allocation of M RBG clusters may be expressed by the following equation 8.

$$r = \sum_{i=0}^{M'-1} \binom{N-s_i}{M'-i}, \binom{x}{y} = \begin{cases} \binom{x}{y} & \text{if } x \geq y \\ 0 & \text{if } x < y \end{cases} \quad \text{[Equation 8]}$$

Here, $\{s_i\}_{i=0}^{M'-1} (0 \leq s_i \leq N, s_i < s_{i+1})$ denotes M'(=2M) sorted RBG indices, and $$\binom{x}{y}$$

is denoted by $$\frac{x(x-1)\ldots(x-y+1)}{y(y-1)\ldots 1}.$$

While Method 2 is designed to use RBG border indexing instead of RBG indexing, Method 2 need not define additional virtual RBG shown in Method 1.

Figure 14:
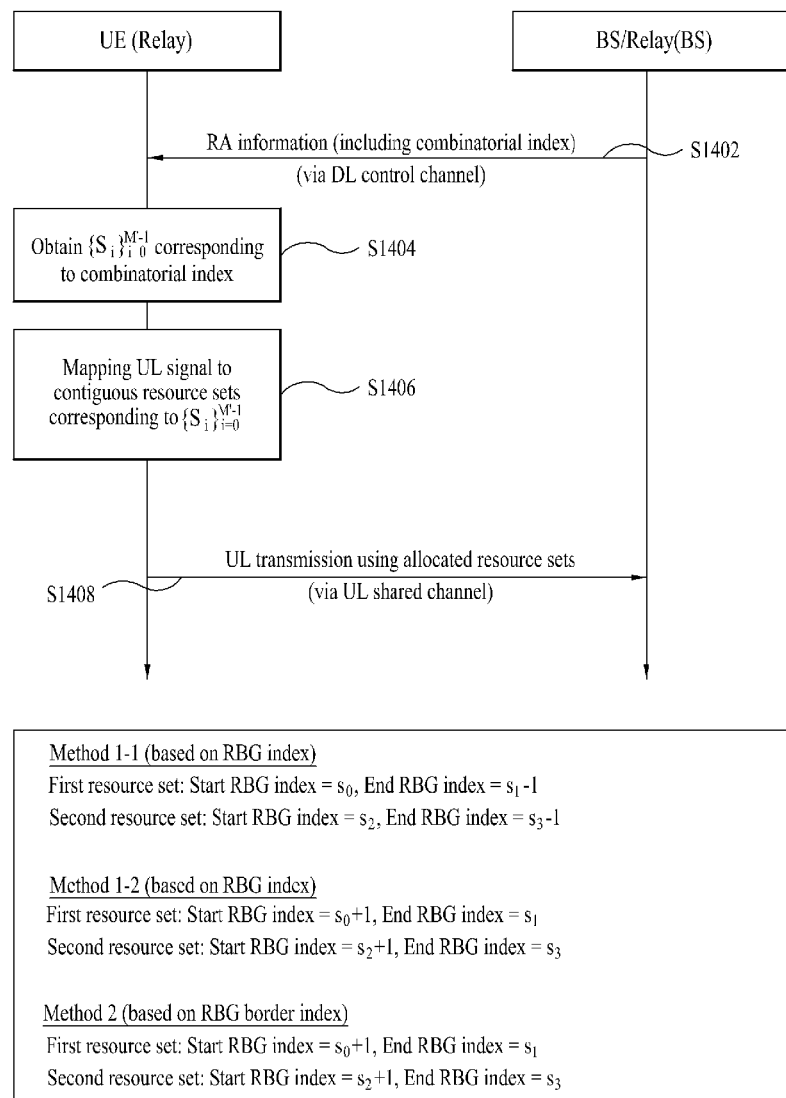

FIG. 14 is a flowchart illustrating UL signal transmission according to an embodiment of the present invention.

Referring to FIG. 14, the UE receives resource allocation information including a combinatorial index from a network node (e.g., a BS or a relay) in step S1402. A field for resource allocation information is contained in DCI and may be received through a downlink control channel (e.g., PDCCH).

If a PDCCH having a DCI format for PUSCH scheduling is detected at a subframe (n), the UE performs PUSCH transmission on the basis of PUCCH information at a subframe (n+4). For this purpose, the UE analyzes resource allocation information. In more detail, the UE obtains $\{s_i\}_{i=0}^{M'-1}$ corresponding to a combinatorial index in step S1404, and confirms a resource set corresponding to $\{s_i\}_{i=0}^{M'-1}$. Therefore, the UE maps an uplink signal to a plurality of contiguous resource sets (e.g., RBG clusters) corresponding to $\{s_i\}_{i=0}^{M'-1}$ in step S1406. FIG. 14 shows the relationship between $\{s_i\}_{i=0}^{M'-1}$ of Methods 1-1, 1-2, and 2 and a resource set on the assumption that two RBG clusters are assigned. The UL signal includes uplink shared channel (UL-SCH) data and/or control information. Finally, the UE performs UL transmission using the resource set allocated from the network node (e.g., BS or relay) in step S1408. UL transmission may be carried out through a PUSCH.

FIG. 15 shows exemplary interpretation of resource allocation information according to an embodiment of the present invention. In FIG. 15, it is assumed that the number of RBGs is 0 and two resource sets (e.g., RBG clusters) are allocated. Each resource set is composed of contiguous resources (e.g., RBGs).

Referring to FIG. 15, if a combinatorial index (r) contained in resource allocation information indicates 117, r is denoted by r=70+35+10+2=117 so that $\{s_0, s_1, s_2, s_3\}=\{2, 3, 5, 8\}_{RBG}$ is achieved. In Method 1-1, since $\{S_m, E_m\} = \{s_{2m-2}, s_{2m-1}-1\}$ is given, $\{S_1, E_1\}=\{s_0, s_1-1\}=\{2,2\}_{RBG}$ and $\{S_2, E_2\}=\{s_2, s_3-1\}=\{5,7\}_{RBG}$ can be achieved. Therefore, RBG #2 and RBGs #5~#7 may be used to transmit UL signals.

Although not shown in FIG. 14, Method 1-2 and Method 2 can also use UL signals as follows.

Method 1-2: $\{S_m, E_m\}=\{s_{2m-2}+1, s_{2m-1}\}$
=>$\{S_1, E_1\}=\{s_0+1, s_1\}=\{3,3\}_{RBG}$ $\{S_2, E_2\}=\{s_2+1, s_3\}=\{6, 8\}_{RBG}$
=>RBG #3 and RBG #6~8 may be used to transmit UL signals.

Method 2: $\{SB_m, EB_m\}=\{s_{2m-2}, s_{2m-1}\}$=>$\{S_m, E_m\}=\{s_{2m-2}+1, s_{2m-1}\}$
=>$\{S_1, E_1\}=\{s_0+1, s_1\}=\{3,3\}_{RBG}$ $\{S_2, E_2\}=\{s_2+1, s_3\}=\{6, 8\}_{RBG}$
=>RBG #3 and RBG #6~8 may be used to transmit UL signals.

The above-mentioned description has been disclosed centering on non-contiguous UL resource allocation. The LTE-A system can support not only contiguous UL resource allocation (also referred to as UL RA Type 0) and non-contiguous UL resource allocation (also referred to as UL RA Type 1). The two resource allocation schemes can be signaled through the same DCI format. In this case, the actually applied resource allocation type can be discriminated using flag bits. For example, as shown in DL RA Types 0/1, a 1-bit flag (also referred to as an RA type bit) is assigned to a DCI format for PUSCH scheduling, so that UL RA Type 0 and UL RA Type 1 can be selectively signaled.

Meanwhile, the RBG size P (i.e., (maximum) P RBs per RBG) for DL RA in the legacy LTE has been defined in Table 5 according to the BW size (e.g., the number $N_{RB}^{UL}$ of DL RBs in DL RW). In addition, DCI format 0 for UL scheduling for use in LTE supports RIV (Resource Indication Value) based RA Type 2. The number of bits contained in the RA field is $\lceil \log_2(N_{RB}^{UL}(N_{RB}^{UL}+1)/2) \rceil$ (excluding an 1-bit frequency hopping (FH) flag). $N_{RB}^{UL}$ is the number of DL RBs in DL RW. Legacy DCI format 0 based on the RBG size defined in the legacy LTE is applied to LTE-A without any change.

LTE-A uses UL non-contiguous RA in which the LTE-A uses the legacy DCI format 0 without changing the RA field size on the basis of the RBG size defined in the legacy LTE so that it can allocate two RBG clusters. For this purpose, the LTE-A can use a total of $O_{DCI\ 0}=\lceil \log_2(N_{RB}^{UL}(N_{RB}^{UL}+1)/2) \rceil+1$ bits including the 1-bit FH flag (that is, FH is not performed in non-contiguous RA) as the RA field. In this case, when using Method 1 and Method 2 for UL non-contiguous RA, a total of $O_{cluster}=\lceil \log_2(_{N+1}C_4) \rceil$ bits is needed (N=$\lceil N_{RB}^{UL}/P \rceil$). Therefore, $O_{cluster} \leq O_{DCI\ 0}$ must be satisfied to implement UL non-contiguous RA using the legacy DCI format 0 without change.

Table 6 shows not only the RBG size P for each BW in LTE calculated on the basis of Table 5, but also the number N of RBGs. In Table 6, bold and enlarged parts (BWs: 7, 9~10, 55~63, 85~90, and 101~110 RBs) shown in Table 6 may indicate BWs not satisfying $O_{cluster} \leq O_{DCI\,0}$.

TABLE 6

| BW [RB] | RBG size | # of RBGs |
|---|---|---|
| 6 | 1 | 6 |
| 7 | 1 | 7 |
| 8 | 1 | 8 |
| 9 | 1 | 9 |
| 10 | 1 | 10 |
| 11 | 2 | 6 |
| 12 | 2 | 6 |
| 13 | 2 | 7 |
| 14 | 2 | 7 |
| 15 | 2 | 8 |
| 16 | 2 | 8 |
| 17 | 2 | 9 |
| 18 | 2 | 9 |
| 19 | 2 | 10 |
| 20 | 2 | 10 |
| 21 | 2 | 11 |
| 22 | 2 | 11 |
| 23 | 2 | 12 |
| 24 | 2 | 12 |
| 25 | 2 | 13 |
| 26 | 2 | 13 |
| 27 | 3 | 9 |
| 28 | 3 | 10 |
| 29 | 3 | 10 |
| 30 | 3 | 10 |
| 31 | 3 | 11 |
| 32 | 3 | 11 |
| 33 | 3 | 11 |
| 34 | 3 | 12 |
| 35 | 3 | 12 |
| 36 | 3 | 12 |
| 37 | 3 | 13 |
| 38 | 3 | 13 |
| 39 | 3 | 13 |
| 40 | 3 | 14 |
| 41 | 3 | 14 |
| 42 | 3 | 14 |
| 43 | 3 | 15 |
| 44 | 3 | 15 |
| 45 | 3 | 15 |
| 46 | 3 | 16 |
| 47 | 3 | 16 |
| 48 | 3 | 16 |
| 49 | 3 | 17 |
| 50 | 3 | 17 |
| 51 | 3 | 17 |
| 52 | 3 | 18 |
| 53 | 3 | 18 |
| 54 | 3 | 18 |
| 55 | 3 | 19 |
| 56 | 3 | 19 |
| 57 | 3 | 19 |
| 58 | 3 | 20 |
| 59 | 3 | 20 |
| 60 | 3 | 20 |
| 61 | 3 | 21 |
| 62 | 3 | 21 |
| 63 | 3 | 21 |
| 64 | 4 | 16 |
| 65 | 4 | 17 |
| 66 | 4 | 17 |
| 67 | 4 | 17 |
| 68 | 4 | 17 |
| 69 | 4 | 18 |
| 70 | 4 | 18 |
| 71 | 4 | 18 |
| 72 | 4 | 18 |
| 73 | 4 | 19 |
| 74 | 4 | 19 |
| 75 | 4 | 19 |
| 76 | 4 | 19 |
| 77 | 4 | 20 |
| 78 | 4 | 20 |
| 79 | 4 | 20 |
| 80 | 4 | 20 |
| 81 | 4 | 21 |
| 82 | 4 | 21 |
| 83 | 4 | 21 |
| 84 | 4 | 21 |
| 85 | 4 | 22 |
| 86 | 4 | 22 |
| 87 | 4 | 22 |
| 88 | 4 | 22 |
| 89 | 4 | 23 |
| 90 | 4 | 23 |
| 91 | 4 | 23 |
| 92 | 4 | 23 |
| 93 | 4 | 24 |
| 94 | 4 | 24 |
| 95 | 4 | 24 |
| 96 | 4 | 24 |
| 97 | 4 | 25 |
| 98 | 4 | 25 |
| 99 | 4 | 25 |
| 100 | 4 | 25 |
| 101 | 4 | 26 |
| 102 | 4 | 26 |
| 103 | 4 | 26 |
| 104 | 4 | 26 |
| 105 | 4 | 27 |
| 106 | 4 | 27 |
| 107 | 4 | 27 |
| 108 | 4 | 27 |
| 109 | 4 | 28 |
| 110 | 4 | 28 |

The following description proposes a method for satisfying the above condition $O_{cluster} \leq O_{DCI\,0}$ to support UL non-contiguous RA based on Methods 1 and 2. One case in which the legacy DCI format 0 is used will be first described and another case in which a DCI format (for convenience of description, referred to as DCI format X) for UL MIMO is used will then be described.

UL Non-Contiguous RA Using DCI Format 0

The following methods Alt 0) to Alt 5) can be considered to satisfy the above-mentioned condition ($O_{cluster} \leq O_{DCI\,0}$).

Alt 0) This method supports non-contiguous RA only to a BW satisfying $O_{cluster} \leq O_{DCI\,0}$.

Alt 1) Some parts of the RBG size for each BW defined in legacy LTE is changed.

Alt 2) RBG size per BW defined in the legacy LTE is used without change, and a BW to which RA is applied is separately defined.

Alt 3) RBG or RB range for RA application is indicated through RRC signaling.

Alt 4) RA field is extended by borrowing/adding a specific bit in DCI format 0.

Alt 5) New RA field of DCI format 0 is defined for LTE-A.

Detailed description of the above-mentioned Alt 1) to Alt 5) methods is as follows.

Alt 0) This Method Supports Non-Contiguous RA Only to BW Satisfying $O_{cluster} \leq O_{DCI\,0}$.

In order to support a non-contiguous RA only using the RA field composed of $O_{DCI\ 0}$ bits in a BW satisfying $O_{cluster} > O_{DCI\ 0}$, the number of RBGs per BW defined in the legacy LTE, the application range of RBGs, and/or the RBG size may be unavoidably adjusted. For example, the number of RBGs and the application may be reduced or the RBG size may be extended. As a result, scheduling flexibility and granularity may be deteriorated. Therefore, in association with the BW satisfying $O_{cluster} \leq O_{DCI\ 0}$, contiguous RA based on the legacy Rel-8 RIV scheme and non-contiguous RA based on Methods 1 and 2 are simultaneously supported. In association with a BW satisfying $O_{cluster} > O_{DCI\ 0}$, a method for supporting only the contiguous RA may be considered. Provided that the RA type bit indicates the non-contiguous RA scheme at the BW of $O_{cluster} > O_{DCI\ 0}$, the UE may determine the occurrence of errors and may drop UL transmission.

Alt 1) Some Parts of RBG Size for Each BW Defined in the Legacy Rel-8 are Changed.

First, when considering RA application for N RBGs, the per-BW UL RBG size may be changed as shown in Table 7 ($N = \lceil N_{RB}^{UL}/P \rceil$, $O_{cluster} = \lceil \log_2({}_{N+1}C_4) \rceil$).

TABLE 7

| System bandwidth $N_{RB}^{UL}$ | UL RBG size (P) |
| --- | --- |
| ≤10 | undefined |
| 11-26 | 2 |
| 27-54 | 3 |
| 55-84 | 4 |
| 85-110 | 5 |

When considering RA application to (N−1) UL RBGs contained in BW, the UL RBG size for each BW may be changed as shown in Table 8 ($N = \lceil N_{RB}^{UL}/P \rceil$, $O_{cluster} = \lceil \log_2({}_{N}C_4) \rceil$). In this case, one RBG excluded from an RA object may be an RBG having the first or last RBG index. Since the number of RBs contained in the last RBG may be equal to or less than P, RBG having the last RBG index may be excluded.

TABLE 8

| System bandwidth $N_{RB}^{UL}$ | UL RBG size (P) |
| --- | --- |
| ≤9 | 1 |
| 10-26 | 2 |
| 27-57 | 3 |
| 58-88 | 4 |
| 89-110 | 5 |

When considering RA application to (N−2) UL RBGs contained in BW, the UL RBG size for each BW may be changed as shown in Table 9 ($N = \lceil N_{RB}^{UL}/P \rceil$, $O_{cluster} = \lceil \log_2({}_{N-1}C_4) \rceil$). In this case, two RBGs excluded from an RA object may be an RBG having the first or last RBG index. PUCCH transmission is hopped to the opposite side of the frequency band on the basis of a slot, RBGs excluded from both ends of the frequency band may be utilized for PUCCH signal transmission.

TABLE 9

| System bandwidth $N_{RB}^{UL}$ | UL RBG size (P) |
| --- | --- |
| ≤10 | 1 |
| 11-26 | 2 |

TABLE 9-continued

| System bandwidth $N_{RB}^{UL}$ | UL RBG size (P) |
| --- | --- |
| 27-60 | 3 |
| 61-108 | 4 |
| 109-110 | 5 |

Alt 2) RBG Size for Each BW Defined in Legacy Rel-8 is Applied without Change, and BW to which RA is Applied is Independently Defined.

In Alt 2), RBG indexing based on Table 5 is applied, and a BW (simply, BW for RA ($BW_{RA}$)) to which RA is applied can be independently defined. For example, $BW_{RA}$ can be defined using the number $N_{RBG}^{UL,ex}$ RBG of RBGs excluded from the actual BW. That is, RA can be applied only to an RA-purposed BW (i.e., a total of $N - N_{RBG}^{UL,ex}$ RBGs) ($N = \lceil N_{RB}^{UL}/P \rceil$, $O_{cluster} = \lceil \log_2({}_{N - N_{RBG}^{UL,ex} + 1}C_4) \rceil$).

In case of $N_{RBG}^{UL,ex} = 1$, one RBG to be excluded may be an RBG having the last RBG index. In case of $N_{RBG}^{UL,ex} = 2$, two RBGs to be excluded may include an RBG having a first RBG index and an RBG having a last RBG index. As a result, PUCCH resource efficiency can be increased considering that PUCCH transmission is hopped to the opposite side of a frequency band on the basis of a slot. In case of $N_{RBG}^{UL,ex} = 3$, three RBGs to be excluded may be an RBG having a first RBG index, an RBG having the last RBG index, and an RBG having an index (i.e., the last RBG index−1) contiguous to the last RBG index.

Table 10 exemplarily shows $N_{RBG}^{UL,ex}$ changing with BW.

TABLE 10

| System bandwidth $N_{RB}^{UL}$ | Number of excluded UL RBGs ($N_{RBG}^{ex}$) |
| --- | --- |
| 6, 8, 11-54, 64-84, 91-100 | 0 |
| 7, 9, 55-57, 85-88, 101-104 | 1 |
| 10, 58-60, 89-90, 105-108 | 2 |
| 61-63, 109-110 | 3 |

For BW definition, the number $N_{RB}^{UL,ex}$ of UL RBs actually excluded from BW can be defined as shown in Table 11. In this case, RBG indexing based on Table 5 is performed only for $BW_{RA}$ (a total of $N_{RB}^{UL} - N_{RB}^{UL,ex}$ RBs) and RA can be applied to $BW_{RA}$ ($N = \lceil (N_{RB}^{UL} - N_{RB}^{UL,ex})/P \rceil$, $O_{cluster} = \lceil \log_2({}_{N+1}C_4) \rceil$). Here, in case of $N_{RB}^{UL,ex} = 2a - 1$ (where a is a positive integer), RBs to be excluded may be an RB corresponding to the first (a−1) RB indices and an RB corresponding to the last a RB indices. In case of $N_{RB}^{UL,ex} = 2a$, RBs to be excluded may be an RB corresponding to the first a RB indices and an RB corresponding to the last a RB indices.

TABLE 11

| System bandwidth $N_{RB}^{UL}$ | Number of UL RBs to be excluded ($N_{RB}^{UL,ex}$) |
| --- | --- |
| 6, 8, 11-54, 64-84, 91-100 | 0 |
| 7, 9, 55, 85, 101 | 1 |
| 10, 56, 86, 102 | 2 |

TABLE 11-continued

| System bandwidth $N_{RB}^{UL}$ | Number of UL RBs to be excluded ($N_{RB}^{UL,ex}$) |
|---|---|
| 57, 87, 103 | 3 |
| 58, 88, 104 | 4 |
| 59, 89, 105 | 5 |
| 60, 90, 106 | 6 |
| 61, 107 | 7 |
| 62, 108 | 8 |
| 63, 109 | 9 |
| 110 | 10 |

Alt 3) Method Alt-3 Indicates RBG or RB Range Applied to RA through RRC Signaling.

Method Alt-3 can indicate a UL RBG range (simply, RA-purposed UL RBG range, $RBG_{RA}$ range) through RRC signaling. In this case, RBG indexing based on Table 5 can be applied only to corresponding RBGs (i.e., a plurality of $RBG_{RA}$s), and RA can be applied only to the corresponding RBG range. In order to indicate the $RBG_{RA}$ range, the start RBG index and/or the last RBG index of the corresponding range, or the start RBG index and the number of contiguous RBGs can be indicated.

In another example, it is impossible to indicate the RA-purposed RB range (simply, RA-purposed RB range or $RB_{RA}$ range) through RRC signaling. In this case, indexing based on Table 5 can be applied only to the corresponding RBs (i.e., a plurality of $RB_{RA}$s), and RA can be applied only to the corresponding RB range. In order to indicate the $RB_{RA}$ range, the start RB index and/or the last RB index of the corresponding range, or the start RB index and the number of contiguous RBs can be indicated.

Alt 4) Method Alt-4 Extends the RA Field by Borrowing/Adding a Specific Bit Contained in DCI Format 0.

A specific bit in DCI format 0 is borrowed so that the specific bit can be incorporated in the RA field in case of non-contiguous RA. For example, in case of non-contiguous RA, one bit of a CQI request field contained in DCI format 0 may be used/interpreted as a part of the RA field. The CQI request field is composed of 1 bit, and thus the CQI request function is disabled in case of non-contiguous RA. That is, in case of non-contiguous RA application, the base station cannot indicate the CQI request. In another example, in case of non-contiguous RA, one bit from among the 3-bit field indicating a DMRS CS (DeModulation Reference Signal Cyclic Shift) may be incorporated in the RA field. That is, in case of non-contiguous RA application, 2 bits from among 3 bits contained in the DMRS CS field may be used to indicate a DMRS CS in accordance with its original usage, and one bit from among the 3 bits may be used/interpreted as a part of the RA field.

Table 12 exemplarily shows the RBG size for each BW according to the present invention. Table 12 exemplarily shows that one bit is borrowed from another field so as to extend the size of RA field.

TABLE 12

| System bandwidth $N_{RB}^{UL}$ | UL RBG size (P) |
|---|---|
| ≤9 | 1 |
| 10-26 | 2 |
| 27-63 | 3 |
| 64-110 | 4 |

In addition to periodic SRS (Sounding Reference Signal) in the legacy, the LTE-A considers dynamically or aperiodically transmitting SRS so as to perform UL MIMO transmission and burst traffic processing. For this end, the dynamic/aperiodic SRS transmission can be triggered through a PDCCH. In this case, one bit for SRS trigger may also be added to a DCI format. In this case, one bit for SRS trigger may be borrowed and merged into the RA field of the non-contiguous RA. Therefore, in case of non-contiguous RA application, the SRS trigger function is automatically disabled, and the BS and the UE can use/interpret the corresponding one bit as a part of the RA field (i.e., the eNB cannot indicate SRS trigger during the non-contiguous RA).

Meanwhile, in case of non-contiguous RA, it may be configured whether a specific bit (e.g., 1 bit of the CQI request field, 1 bit of the DMRS CS field, and 1 bit of the SRS trigger field) is to be used as the RA field or to be used as an original function through RRC signaling. In addition, the specific bit is not borrowed (i.e., the function of the corresponding bit is not disabled), and one bit may be added to a DCI format 0 so as to extend the RA field. In this case, in order to prevent additional blind decoding (BD) from increasing in the common search space, a method for adding one bit to the RA field of the DCI format 0 may be limited to a UE-specific search space.

More specifically, Method Alt-4 can be applied only to the bold and enlarged parts (BW of $O_{cluster} > O_{DCI\ 0}$) (BWs: 7, 9~10, 55~63, 85~90, 101~110 RBs) shown in Table 6.

Alt 5) New RA Field of DCI Format 0 for LTE-A is Defined.

The legacy RIV-based RA type 2 and Methods 1 and 2 can be applied on the basis of the RBG size for each BW defined in the legacy LTE without any other processing, such that a total number $O_{DCI\ 0}$ (except for 1-bit FH flag) of bits contained in the RA field for DCI format 0 for use in the LTE-A can be newly defined as shown in the following equation 9.

$$O_{DCI\ 0} = \text{Max}(\lceil \log_2({}_{N+1}C_4) \rceil - 1, \lceil \log_2(N_{RB}^{UL}(N_{RB}^{UL}+1)/2) \rceil) N = \lceil N_{RB}^{UL}/P \rceil \quad \text{[Equation 9]}$$

Here, $O_{DCI0}$ is the number of bits of the RA field for RBG allocation. N is the number of UL RBGs. $N_{RB}^{UL}$ is the number of UL RBs. P is the size of UL RBG. The UL RBG size may be denoted by Table 5 according to a BW. $\lceil \ \rceil$ is a ceiling function. Max(x, y) is the higher one of x and y. ${}_xC_y$ is a number of cases for selecting y number of parts from among x number of parts, and is denoted by $$_xC_y = \binom{x}{y} = \frac{x(x-1) \ldots (x-y+1)}{y(y-1) \ldots 1}.$$

If N shown in Equation 9 is replaced with $\lceil N_{RB}^{UL}/P \rceil$, the replaced result can be represented by the following equation 10.

$$O_{DCI0} = \text{Max}\left(\left\lceil \log_2\left(\binom{\lceil N_{RB}^{UL}/P \rceil + 1}{4}\right) \right\rceil\right) - 1, \lceil \log_2(N_{RB}^{UL}+1)/2) \rceil$$

$$= \text{Max}\left(\left\lceil \log_2\left(\binom{\lceil N_{RB}^{UL}/P + 1 \rceil}{4}\right) \right\rceil\right) - 1, \lceil \log_2(N_{RB}^{UL}(N_{RB}^{UL}+1)/2) \rceil) \quad \text{[Equation 10]}$$

In this case, in order to prevent additional blind decoding (BD) from increasing in the common search space, a method for adding one bit to the RA field of DCI format 0 may be limited to a UE-specific search space. Therefore, in case of using the RA field for LTE-A DCI format 0 in a common search space, after the RA field is allocated in the same manner as in the RA field size of the legacy DCI format 0, Methods Alt-1 to Alt-4 may be used or a method for preventing non-contiguous RA from being supported to all BWs may be considered.

Preferably, in case of a BW composed of 10 RBs or less, the number of RBs is small in number, such that non-contiguous RA may not be used. As a result, Methods Alt-0 to Alt-5 may not be applied to the BW composed of 10 RBs or less.

A method for arranging RA information bits in the RA field of DCI format 0 will hereinafter be described in detail. For explanation, it is assumed that the number of bits contained in the RA field (including 1-bit FH flag) of DCI format 0 to which Methods Alt-0 to Alt-5 are applied is denoted by $N_1$, and the number of bits contained in non-contiguous RA is denoted by $M_1$. If $M_1 < N_1$ is given under non-contiguous RA, the following methods can be used to arrange $M_1$ bits in the RA field. For convenience of description, the order of RA-field constructing bits starting from the 1-bit FH flag is denoted by $b_1, b_2, \ldots, b_{N_1}$ (i.e., $b_1$ is an FH flag).

1) $M_1$ bits (i.e., $b_1, \ldots, b_{M_1}$) are allocated to MSB part.
2) $M_1$ bits (i.e., $b_2, \ldots, b_{M_1+1}$) are allocated to MSB part other than FH flag.
3) $M_1$ bits (i.e., $b_{N_1-M_1+1}, \ldots, b_{N_1}$) are allocated to LSB part.

In this case, the remaining $(N_1 - M_1)$ bits not corresponding to $M_1$ bits allocated through Methods 1), 2) and 3) are set to predetermined values (specifically, all bits are set to '0'), such that the virtual CRC for error detection can be used as necessary.

It is assumed that the number of bits constructing the RA field (excluding 1-bit FH flag) of DCI format 0 to which Methods Alt-0 to Alt-5 are applied is denoted by $N_2$, and the number of bits contained in the contiguous RA is denoted by $M_2$. If $M_2 < N_2$ is given under contiguous RA application, the following methods can be used to arrange $M_2$ bits in the RA field composed of $N_2$ bits. For convenience of description, the order of RA field construction bits (excluding 1-bit FH flag) is denoted by $b_1, b_2, \ldots, b_{N_2}$.

1) $M_2$ bits (i.e., $b_1, \ldots, b_{M_2}$) are allocated to MSB part.
2) $M_2$ bits (i.e., $b_{N_2-M_2+1}, \ldots, b_{N_2}$) are allocated to LSB part.

In this case, the remaining $(N_2 - M_2)$ bits not corresponding to $M_2$ bits allocated through Methods 1) and 2) are set to predetermined values (specifically, all bits are set to '0'), such that the virtual CRC for error detection can be used as necessary.

UL Non-Contiguous RA Using DCI Format X

LTE-A can support uplink MIMO transmission differently from the legacy LTE, and a DCI format (i.e., DCI format X) for UL MIMO scheduling may be newly defined. In addition, non-contiguous RA can be supported in UL MIMO transmission, and the RA field can be defined in the DCI format X. For reference, frequency hopping is not supported in UL MIMO, such that 1-bit FH flag is not defined.

Therefore, when applying non-contiguous RA using the DCI format X, the RA field size of a DCI format X is allocated ($O_{DCIX} = O_{DCI\,0} = \lceil \log_2(N_{RB}^{UL}(N_{RB}^{UL}+1)/2) \rceil + 1$) in the same manner as in the RA field size of the legacy DCI format 0 (including 1-bit FH flag), Methods Alt-0 to Alt-4 may be used.

In another method, RA of RA types 0 and 1 can be used on the basis of the per-BW RBG size defined in the legacy LTE without any other processing, such that a total number $O_{DCIX}$ of bits contained in the RA field can be newly defined by the following equation 11 (Method Alt-5).

$$O_{DCIX} = \text{Max}(\lceil \log_2(_{N+1}C_4) \rceil, \lceil \log_2(N_{RB}^{UL}(N_{RB}^{UL}+1)/2) \rceil) N = \lceil N_{RB}^{UL}/P \rceil \quad \text{[Equation 11]}$$

In Equation 11, $O_{DCIX}$ is the number of the RA field for RBG allocation. N is the number of UL RBGs. $N_{RB}^{UL}$ is the number of UL RBs. P is a UL RBG size. The UL RBG size may be represented by Table 5 according to UL BW. $\lceil \ \rceil$ is a ceiling function. Max(x, y) is the higher one of x and y. $_xC_y$ is a number of cases for selecting y number of parts from among x number of parts, and is denoted by $$_xC_y = \binom{x}{y} = \frac{x(x-1) \ldots (x-y+1)}{y(y-1) \ldots 1}.$$

If N shown in Equation 11 is replaced with $\lceil N_{RB}^{UL}/P \rceil$, the replaced result can be represented by the following equation 12.

$$O_{DCI0} = \text{Max}\left(\left\lceil \log_2\left(\binom{\lceil N_{RB}^{UL}/P \rceil + 1}{4}\right)\right\rceil\right) - 1, \lceil \log_2(N_{RB}^{UL}+1)/2) \rceil \quad \text{[Equation 12]}$$

$$= \text{Max}\left(\left\lceil \log_2\left(\binom{\lceil N_{RB}^{UL}/P + 1 \rceil}{4}\right)\right\rceil\right) - 1, \lceil \log_2(N_{RB}^{UL}(N_{RB}^{UL}+1)/2) \rceil$$

In case of DCI format X for UL MIMO, blind decoding (BD) can be performed independently from other DCI formats. Therefore, adding one bit to the RA field in Method Alt-4 and Equation 10 based on Method Alt-5 can be commonly used without distinction between the common search space and the UE-specific search space.

In the meantime, assuming that the number of bits constructing the RA field of DCI format X to which Methods Alt-0 to Alt-5 are applied is denoted by L, and the number of bits needed for the actual RA is denoted by K (irrespective of RA type), the following method may be used as a method for arranging K bits to the RA field in case of K<L. The size of RA field may be different from the size of RA information in the following cases. For better understanding of the present invention, the following description will focus upon Method Alt-5. In Method Alt-5, the size of RA field in the configured UL BW is determined to be a higher one of the size of RA information of RA type 0 and the information size of RA type 1. Therefore, if the RA field size is given on the basis of RA type 0 and the RA type bit indicates RA type 1, the size of RA information may be smaller than the size of RA field. On the other hand, assuming that the size of RA field is given on the basis of RA type 1 and the RA type bit indicates RA type 0, the RA information size may be smaller than the RA field size.

For convenience of description, the order of RA-field constructing bits is denoted by $b_1, b_2, \ldots, b_L$.

1) K bits (i.e., $b_1, \ldots, b_K$) are allocated to MSB part.
2) K bits (i.e., $b_{L-K+1}, \ldots, b_L$) are allocated to LSB part.

In this case, the remaining (L−K) bits not corresponding to K bits allocated through Methods 1) and 2) are set to predetermined values (specifically, all bits are set to '0'), such that the virtual CRC for error detection can be used as necessary.

Figure 16:
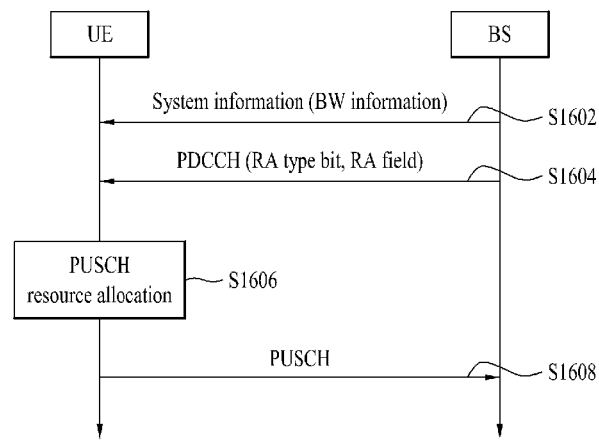
FIG. 16 is a flowchart illustrating an uplink transmission procedure according to an embodiment of the present invention.

FIG. 16 is a flowchart illustrating an uplink transmission procedure according to an embodiment of the present invention. For convenience of description, it is assumed that Method Alt-5 is used.

Referring to FIG. 16, a base station (BS) broadcasts system information to a user equipment (UE) in step S1602. The system information may include BW information. System bandwidth information may include information of an uplink BW. UL BW may be given using the number N of UL RBs. Thereafter, the BS transmits a PDCCH signal for UL scheduling to the UE in step S1604. PDCCH signal includes a DCI format for UL scheduling. In a single antenna (port) transmission mode, the PDCCH signal includes a DCI format 0. In case of multiple antennas (multiple ports) transmission (also called a MIMO transmission) mode, the PDCCH signal includes DCI format X. DCI format 0/X may include a resource assignment (RA) type bit and a resource assignment (RA) field. The RA type bit may be used to indicate RA Type 0 or 1, and may be composed of 1 bit. The RA field may be used for UL RBG allocation. The RA field size may be denoted by Equations 9 to 12 (for example, $$\text{Max}\left(\left\lceil log_2\left(\binom{\lceil N_{RB}^{UL}/P+1 \rceil}{4}\right)\right\rceil, \lceil log_2(N_{RB}^{UL}+1)/2) \rceil\right).$$

After the UE interprets the RA type bit and the RA field of the PDCCH signal, resources for PUSCH transmission are allocated in step S1604. In case of RA type 0, resources for PUSCH transmission may be composed of one or more contiguous RBs according to an RIV value of the RA field. In contrast, in case of RA type 1, a resource of PUSCH transmission may be composed of two non-contiguous clusters according to a combinatorial index of the RA field (See FIGS. 11 to 15). Each cluster is composed of one or more contiguous RBGs. Thereafter, the UE transmits a PUCCH signal to the base station (BS) using the allocated resources in step S1606.

Figure 17:
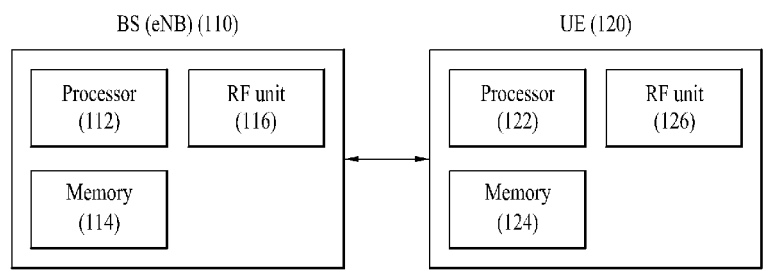
FIG. 17 is a block diagram illustrating a base station (BS) and a user equipment (UE) applicable to embodiments of the present invention.

FIG. 17 is a block diagram illustrating a base station (BS) and a user equipment (UE) applicable to embodiments of the present invention. A BS-UE block diagram shown in FIG. 17 may be replaced with a BS-RN block diagram or an RN-UE block diagram.

Referring to FIG. 17, the wireless communication system includes a base station (BS) 110 (also denoted by 'eNB') and a UE 120. The BS 110 includes a processor 112, a memory 114, and a radio frequency (RF) unit 116. The processor 112 may be constructed to implement the procedures and/or methods disclosed in the embodiments of the present invention. The memory 114 may be connected to a processor 112, and store various information related to operations of the processor 112. The RF unit 116 is connected to the processor 112, and transmits and/or receives RF signals. The UE 120 includes a processor 122, a memory 124, and an RF unit 126. The processor 122 may be constructed to implement the procedures and/or methods disclosed in the embodiments of the present invention. The memory 124 may be connected to a processor 122, and store various information related to operations of the processor 122. The RF unit 126 is connected to the processor 122, and transmits and/or receives RF signals. The BS 110 and/or the UE 120 may include a single antenna or multiple antennas.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Exemplary embodiments of the present invention can be applied to wireless communication systems such as a UE, a relay node (RN), and a BS (or eNB).

What is claimed is:

1. A method for transmitting an uplink signal by a device in a wireless communication system, the method comprising:

receiving a downlink control channel (DCI) format defined for an uplink (UL) multi-antenna transmission mode, the DCI format including a resource allocation (RA) field; and transmitting an uplink signal using the RA field, wherein a size of the RA field is represented by the following expression:

MAX(RASizeA,RASizeB), wherein RASizeA is a first number of bits required for representing a resource indication value (RIV) corresponding to a starting resource block (RB) and a length of contiguously allocated RBs within a given uplink bandwidth, wherein RASizeB is a second number of bits required for representing a combinatorial index r corresponding to 4 indexes, and the 4 indexes are used to indicate a start resource block group (RBG) index and an end RBG index of a first RB set and a start RBG index and an end RBG index of a second RB set within the given uplink bandwidth, and wherein RASizeA is determined based on $N_{RB}^{UL}(N_{RB}^{UL}+1)/2$, RASizeB is determined based on $$\binom{\lceil N_{RB}^{UL}/P+1 \rceil}{4},$$

and MAX is a maximum function, where $N_{RB}^{UL}$ is the number of UL RBs, P is a size of UL RBG, $\lceil \ \rceil$ is a ceiling function, and $$\binom{x}{y} \text{ is } \frac{x(x-1)\wedge(x-y+1)}{y(y-1)\wedge 1}.$$

2. The method of claim 1, wherein RASizeA is $\lceil \log_2(N_{RB}^{UL}(N_{RB}^{UL}+1)/2) \rceil$, and RASizeB is $$\left\lceil \log_2\left(\binom{\lceil N_{RB}^{UL}/P+1 \rceil}{4}\right) \right\rceil.$$

3. The method of claim 2, wherein a value of P is given by the following table:

| $N_{RB}^{UL}$ | Size of UL RBG (P) |
|---|---|
| ≤10 | 1 |
| 11-26 | 2 |
| 27-63 | 3 |
| 64-110 | 4 |

4. The method of claim 1, wherein the combinatorial index r is given by the following expression:

$$r = \sum_{i=0}^{M'-1} \binom{N-s_i}{M'-i}, \binom{x}{y} = \begin{cases} \binom{x}{y} & \text{if } x \geq y \\ 0 & \text{if } x < y \end{cases}$$

where M' is 4, N is (the number of UL RBGs+1), $\{s_i\}_{i=0}^{M'-1}$ satisfies $1 \leq s_i \leq N$ and $s_i < s_{i+1}$, $s_0$ and $s_1-1$ indicate the start RBG index and the end RBG index of the first RB set, and $s_2$ and $s_3-1$ indicate the start RBG index and the end RBG index of the second RB set.

5. The method of claim 1, wherein if RASizeA >RASizeB, the combinatorial index r is included in a Least Significant Part (LSB) part of the RA field.

6. The method of claim 1, wherein the DCI format is transmitted through a Physical Downlink Control Channel (PDCCH), and the uplink signal is transmitted through a Physical Uplink Shared Channel (PUSCH).

7. The method of claim 1, wherein RASizeA is used for a first RA type and the first RA type indicates to a scheduled user equipment (UE) a set of contiguously allocated virtual resource block (VRB) indices.

8. The method of claim 1, wherein RASizeB is used for a second RA type, and each of the first and second RB sets includes consecutive RBGs, each of the RBGs having a size P.

9. A device for use in a wireless communication system, the device comprising:

a memory configured to store data; and a processor, wherein the processor is operatively coupled to the memory and configured to:

receive a downlink control channel (DCI) format defined for an uplink (UL) multi-antenna transmission mode, the DCI format including a resource allocation (RA) field, and transmit an uplink signal using the RA field, wherein a size of the RA field is represented by the following expression:

Max(RASizeA,RASizeB), wherein RASizeA is a first number of bits required for representing a resource indication value (RIV) corresponding to a starting resource block (RB) and a length of contiguously allocated RBs within a given uplink bandwidth, wherein RASizeB is a second number of bits required for representing a combinatorial index r corresponding to 4 indexes, and the 4 indexes are used to indicate a start resource block group (RBG) index and an end RBG index of a first RB set and a start RBG index and an end RBG index of a second RB set within the given uplink bandwidth, and wherein RASizeA is determined based on $N_{RB}^{UL}(N_{RB}^{UL}+1)/2$, RASizeB is determined based on $$\binom{\lceil N_{RB}^{UL}/P+1 \rceil}{4},$$

and MAX is a maximum function, where $N_{RB}^{UL}$ is the number of UL RBs, P is a size of UL RBG, $\lceil \ \rceil$ is a ceiling function, and $$\binom{x}{y} \text{ is } \frac{x(x-1)\wedge(x-y+1)}{y(y-1)\wedge 1}.$$

10. The device of claim 9, wherein RASizeA is $\lceil \log_2(N_{RB}^{UL}(N_{RB}^{UL}+1)/2) \rceil$, and RASizeB is $$\left\lceil \log_2\left(\binom{\lceil N_{RB}^{UL}/P+1 \rceil}{4}\right) \right\rceil.$$

11. The device of claim 10, wherein a value of P is given by the following table:

| $N_{RB}^{UL}$ | Size of UL RBG (P) |
|---|---|
| ≤10 | 1 |
| 11-26 | 2 |
| 27-63 | 3 |
| 64-110 | 4 |

12. The device of claim 9, wherein the combinatorial index r is given by the following expression:

$$r = \sum_{i=0}^{M'-1} \binom{N-s_i}{M'-i}, \binom{x}{y} = \begin{cases} \binom{x}{y} & \text{if } x \geq y \\ 0 & \text{if } x < y \end{cases}$$

where M' is 4, N is (the number of UL RBGs+1), $\{s_i\}_{i=0}^{M'-1}$ satisfies $1 \leq s_i \leq N$ and $s_i < s_{i+1}$,
$s_0$ and $s_1 - 1$ indicate the start RBG index and the end RBG index of the first RB set, and
$s_2$ and $s_3 - 1$ indicate the start RBG index and the end RBG index of the second RB set.

13. The device of claim 9, wherein if RASizeA >RASizeB, the combinatorial index r is included in a Least Significant Part (LSB) part of the RA field.

14. The device of claim 9, wherein the DCI format is transmitted through a Physical Downlink Control Channel (PDCCH), and the uplink signal is transmitted through a Physical Uplink Shared Channel (PUSCH).

15. The device of claim 9, wherein RASizeA is used for a first RA type and the first RA type indicates to a scheduled user equipment (UE) a set of the contiguously allocated virtual resource block (VRB) indices.

16. The device of claim 9, wherein RASizeB is used for a second RA type, and each of the first and second RB sets includes consecutive RBGs, each of the RBGs having a size P.

17. The device of claim 9, further comprising:
a transceiver,
wherein the processor receives the DCI format using the transceiver.

* * * * *